United States Patent
Bobda et al.

(10) Patent No.: US 12,526,140 B2
(45) Date of Patent: Jan. 13, 2026

(54) SYSTEM AND METHOD FOR SECURE CLOUD FPGA DEPLOYMENT

(71) Applicant: University of Florida Research Foundation, Incorporated, Gainesville, FL (US)

(72) Inventors: Christophe Bobda, Gainesville, FL (US); Maximillian Kealoha Panoff, Gainesville, FL (US); Muhammed Kawser Ahmed, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 24 days.

(21) Appl. No.: 18/752,011

(22) Filed: Jun. 24, 2024

(65) Prior Publication Data

US 2025/0007710 A1    Jan. 2, 2025

Related U.S. Application Data

(60) Provisional application No. 63/511,371, filed on Jun. 30, 2023.

(51) Int. Cl.
*H04L 9/14*    (2006.01)
*H04L 9/08*    (2006.01)

(52) U.S. Cl.
CPC ............ *H04L 9/14* (2013.01); *H04L 9/0861* (2013.01)

(58) Field of Classification Search
CPC ................................ H04L 9/14; H04L 9/0861
See application file for complete search history.

(56) References Cited

U.S. PATENT DOCUMENTS 5,821,772 A * 10/1998 Ong ................. H03K 19/17748
326/38
5,946,219 A * 8/1999 Mason ..................... G06F 30/34
716/117

(Continued)

FOREIGN PATENT DOCUMENTS

CN    102279838 A  * 12/2011
CN    106168931 A  * 11/2016  ............. G06F 21/79

(Continued)

OTHER PUBLICATIONS

Zeitouni, et al., "Trusted Configuration in Cloud FPGAs," *IEEE 29th Annual International Symposium on Field-Programmable Custom Computing Machines*, pp. 233-241, (2021), DOI 10.1109/FCCM51124.2021.00036.

(Continued)

*Primary Examiner* — John B King
(74) *Attorney, Agent, or Firm* — Alston & Bird LLP

(57) ABSTRACT

A method and system are directed to enabling tenant-side design checks for cloud field-programmable gate array (FPGA) deployment. A pseudo-trusted execution environment is created at a tenant device to tie a hash of a compiled bitstream to a hash of design rule or virus scan results, which is sent along with an encrypted version of a bitstream to a cloud provider device that recovers the hash of the design and forwards the encrypted bitstream to a root-of-trust (RoT) on a FPGA to program. The RoT checks the hash provided by the cloud provider device against a supplied bitstream from the tenant device to confirm they match before programming.

19 Claims, 16 Drawing Sheets

(56) References Cited

U.S. PATENT DOCUMENTS

| | | | | |
|---|---|---|---|---|
| 6,654,889 | B1* | 11/2003 | Trimberger | H04L 9/3236 713/188 |
| 7,143,295 | B1* | 11/2006 | Trimberger | G06F 21/76 713/193 |
| 7,269,738 | B1* | 9/2007 | Kivimaki | H04L 9/0625 713/193 |
| 7,606,362 | B1* | 10/2009 | Streicher | H04L 9/0861 380/29 |
| 7,725,738 | B1* | 5/2010 | Langhammer | G06F 21/76 726/26 |
| 7,809,544 | B1* | 10/2010 | Trimberger | G06F 30/331 716/128 |
| 7,971,072 | B1* | 6/2011 | Donlin | H04L 63/0428 713/169 |
| 8,042,079 | B1* | 10/2011 | Sundararajan | G06F 30/34 717/109 |
| 8,331,555 | B1* | 12/2012 | Mundschau | H04L 9/0643 380/28 |
| 10,177,922 | B1* | 1/2019 | Hamlet | H04L 9/3278 |
| 10,708,073 | B2* | 7/2020 | Profumo | H04L 9/3247 |
| 11,042,610 | B1* | 6/2021 | Neema | G06F 21/602 |
| 11,074,380 | B2* | 7/2021 | Atta | G06F 30/327 |
| 2002/0188648 | A1* | 12/2002 | Aweya | H04L 49/90 718/100 |
| 2005/0156626 | A1* | 7/2005 | Tomar | G06F 30/34 326/38 |
| 2011/0138192 | A1* | 6/2011 | Kocher | H04L 9/003 713/189 |
| 2014/0043059 | A1* | 2/2014 | Speers | H03K 19/003 326/9 |
| 2014/0247944 | A1* | 9/2014 | Kocher | H04L 9/3271 380/286 |
| 2016/0098504 | A1* | 4/2016 | Larzul | G06F 30/367 716/136 |
| 2016/0327609 | A1* | 11/2016 | Larzul | G01R 31/31703 |
| 2018/0034793 | A1* | 2/2018 | Kibalo | G06F 21/575 |
| 2018/0123789 | A1* | 5/2018 | Merli | G09C 1/00 |
| 2019/0065757 | A1* | 2/2019 | Graf | G06F 21/577 |
| 2019/0305927 | A1* | 10/2019 | Bhunia | G06F 21/76 |
| 2020/0342112 | A1* | 10/2020 | Plusquellic | G06F 21/602 |
| 2023/0252154 | A1* | 8/2023 | De Santis | G06F 9/4401 713/2 |
| 2024/0154788 | A1* | 5/2024 | Bhunia | G06N 3/08 |
| 2024/0281585 | A1* | 8/2024 | Lin | G06F 30/343 |
| 2024/0296254 | A1* | 9/2024 | Askerov | G06F 21/76 |
| 2025/0238558 | A1* | 7/2025 | Bobda | G06F 21/76 |

FOREIGN PATENT DOCUMENTS

| | | | | |
|---|---|---|---|---|
| CN | 105866665 | B * | 4/2019 | ..... G01R 31/318519 |
| CN | 111208977 | A * | 5/2020 | ............. G06F 8/35 |
| CN | 113836852 | A * | 12/2021 | ........... G06F 30/331 |
| CN | 114785715 | A * | 7/2022 | ............. H04L 43/50 |
| CN | 116466223 | A * | 7/2023 | ........ G01R 31/3177 |
| CN | 116503675 | A * | 7/2023 | ............ G06V 10/764 |
| EP | 1124330 | A2 * | 8/2001 | ............ G06F 21/62 |
| EP | 3537653 | A1 * | 9/2019 | ........... H04L 9/3236 |
| JP | 2004538628 | A * | 12/2004 | ............. G06F 30/34 |
| JP | 2018022212 | A * | 2/2018 | |

OTHER PUBLICATIONS

Panoff, et al., "A Tenant Side Compilation Solution for Cloud FPGA Deployment", *2023 International Conference on Field Programmable Technology*, Dec. 12, 2023, DOI: 10.1109/ICFPT59805.2023.00007.

* cited by examiner

SYSTEM AND METHOD FOR SECURE CLOUD FPGA DEPLOYMENT

CROSS REFERENCE TO RELATED APPLICATION

This application claims the priority of U.S. Provisional Application No. 63/511,371, entitled "SYSTEM AND METHOD FOR SECURE CLOUD FPGA DEPLOYMENT," filed on Jun. 30, 2023, the disclosure of which is hereby incorporated by reference in its entirety.

GOVERNMENT SUPPORT

This invention was made with government support under 2007320 awarded by The National Science Foundation. The government has certain rights in the invention.

TECHNICAL FIELD

Various embodiments of the present disclosure relate to cloud-based hardware acceleration, and more particularly to secure cloud deployment of field-programmable gate array (FPGA) assets.

BACKGROUND

Field-programmable gate arrays (FPGAs) may excel in handling large-scale search optimization, acceleration, and signal processing tasks when compared to CPUs in terms of power, latency, and processing speed. Cloud service providers may provide FPGA-based cloud acceleration services, allowing for customized acceleration with minimal power consumption. However, hardware acceleration that is provided through the cloud may introduce new security concerns. In particular, entire fabric sharing of a power distribution network renders hardware acceleration for cloud computing particularly vulnerable to remote physical side-channel attacks and voltage attacks by malicious actors.

Furthermore, hardware assets deployed by tenants to cloud FPGA providers may contain sensitive information and intellectual property belonging to third-party vendors or the tenants themselves. For example, a malicious cloud provider may steal the contents of a hardware design and launch intellectual property counterfeit, cloning and piracy. Additionally, a malicious cloud provider may induce bitstream tampering resulting in information leakage and denial-of-service.

BRIEF SUMMARY

Various embodiments described herein relate to methods, apparatuses, and systems for protecting hardware intellectual property, particularly of cloud field-programmable gate array (FPGA) deployment.

According to one embodiment, the method comprises generating a bitstream $B_0$ based on a design; determining one or more design rule results (DRR) of the design based on one or more design rules that are associated with a cloud field-programmable gate array (FPGA) provider (CFP) computing entity; generating (i) a bitstream hash $H_0$ based on the bitstream $B_0$ and (ii) a DRR hash $H_{DRR}$ based on the one or more DRR; generating an encrypted bitstream based on one or more of the bitstream hash $H_0$, a CFP-side root of trust (CFPRoT) public key $DS_{Pub}$, or a VTI public key $VTI_{Pub}$; and generating a secure design rule (SDR) data object based on the DRR hash $H_{DRR}$.

In some embodiments, the CFP computing entity is configured to generate a virtual tenant instance (VTI) based on request for one or more cloud FPGA computing resources; and generate a VTI public/private key pair on the VTI, wherein the VTI public/private key pair comprises a VTI public key $VTI_{Pub}$ and a VTI private key $VTI_{Priv}$. In some embodiments, the method further comprises receiving the VTI public key $VTI_{Pub}$; and responsive to receiving the VTI public key $VTI_{Pub}$, providing (i) a tenant public key $IT_{Pub}$ that is associated with a tenant computing entity and (ii) an initial nonce $N_0$ to the VTI. In some embodiments, the VTI is configured to request an interface from the CFP computing entity to one or more FPGA units based on the tenant public key $IT_{Pub}$ and the initial nonce $N_0$ by providing the tenant public key $IT_{Pub}$ and the initial nonce $N_0$ to a CFPRoT; and receiving (i) a double-encrypted identifier, the double-encrypted identifier comprising an asymmetric encryption, using the tenant public key $IT_{Pub}$, of an asymmetric encryption, using a CFPRoT private key $DS_{Priv}$ that is associated with the CFPRoT, of a XOR operation result, and (ii) a single-encrypted identifier, the single-encrypted identifier comprising an asymmetric encryption, using the tenant public key $IT_{Pub}$, of the XOR operation result, wherein the XOR operation result is based on the initial nonce $N_0$ and a CFPRoT identifier that is associated with the CFPRoT.

In some embodiments, the method further comprises receiving the single-encrypted identifier; decrypting the single-encrypted identifier with a tenant private key $IT_{Priv}$ associated with the tenant computing entity; and determining the CFPRoT identifier by generating an XOR operation result based on the decrypted single-encrypted identifier and the initial nonce $N_0$. In some embodiments, the method further comprises providing the CFPRoT identifier to a FPGA manufacturer computing entity; receiving the CFPRoT public key $DS_{Pub}$ from the FPGA manufacturer computing entity based on the CFPRoT identifier; generating a recovered CFPRoT identifier by decrypting the double-encrypted identifier with the tenant private key $IT_{Priv}$ and the CFPRoT public key $DS_{Pub}$; and confirming validity of (i) the CFPRoT public key $DS_{Pub}$ and (i) an origin of the CFPRoT identifier recovered. In some embodiments, the method further comprises receiving, from the CFP computing entity, (i) a bootable image (BI) comprising an executable and (ii) an encrypted session nonce $N_1$ that is encrypted with a tenant-side root of trust (TSRoT) public key $TSRoT_{Pub}$ that is associated with a TSRoT; and decrypting the encrypted session nonce $N_1$ with a TSRoT private key $TSRoT_{Priv}$ that is associated with the TSRoT. In some embodiments, the method further comprises receiving a list of acceptable hash states (AHS) from the CFP computing entity. In some embodiments, the list of AHS is encrypted with the TSRoT public key $TSRoT_{Pub}$ and further comprising decrypting the list of AHS with the TSRoT private key $TSRoT_{Priv}$. In some embodiments, the method further comprises comparing an executable hash of the executable with a true hash that is associated with the executable. In some embodiments, the method further comprises receiving a secure hash state (SHS) from the TSRoT, the SHS comprising an XOR operation result based on a current hash state and a session nonce $N_1$. In some embodiments, the CFP computing entity is configured to determine a raw hash chain state of the BI by (i) double asymmetrically decrypting the SHS based on (a) a TSRoT public key $TSRoT_{Pub}$ and (b) a CFP private key $CFP_{Priv}$ and (ii) generating an XOR operation result based on the decrypted SHS and the session nonce $N_1$.

In some embodiments, the CFP computing entity is configured to generate an expected bitstream hash $EH_0$ by (i) generating an expected DRR hash $H_{\hat{D}RR}$ by hashing an expected DRR, (ii) double asymmetrically decrypting the SDR with (a) an executable public key $E_{pub}$ that is associated with an executable and (b) a CFP private key $CFP_{Priv}$ that is associated with the CFP computing entity, and (iii) generating an XOR operation result based on the double asymmetrically decrypted SDR and the expected DRR hash $H_{\hat{D}RR}$. In some embodiments, the CFP computing entity is configured to receive and convert a third encrypted bitstream $B_3$ into a second encrypted bitstream $B_2$. In some embodiments, the VTI is configured to generate the second encrypted bitstream $B_2$ by decrypting the third encrypted bitstream $B_3$ with a VTI private key $VTI_{Priv}$ that is associated with the VTI. In some embodiments, the CFPRoT is configured to receive the second encrypted bitstream $B_2$ from the VTI; and generate a first encrypted bitstream $B_1$ by decrypting the second encrypted bitstream $B_2$ with a CFPRoT private key $DS_{Priv}$ that is associated with the CFPRoT. In some embodiments, the CFPRoT is configured to generate a recovered bitstream $RB_0$ by decrypting the first encrypted bitstream $B_1$ with an expected bitstream hash $EH_0$. In some embodiments, the CFPRoT is configured to compare a recovered bitstream hash $H(RB_0)$ of the recovered bitstream $RB_0$ with the expected bitstream hash $EH_0$; and program one or more FPGA units with the recovered bitstream $RB_0$ based on the comparison. In some embodiments, the CFP computing entity is configured to (i) generate an expected DRR hash $H_{\hat{D}RR}$ by hashing the expected DRR, (ii) double asymmetrically decrypt the SDR with (a) an executable public key $E_{Pub}$ that is associated with an executable executing on the select one of the tenant computing entities 102 and (b) a CFP private key $CFP_{Priv}$ that is associated with the CFP computing entity, and (iii) generate an XOR operation result based on the double asymmetrically decrypted SDR and the expected DRR hash $H_{\hat{D}RR}$.

According to one embodiment, a computing system comprises memory and one or more processors communicatively coupled to the memory. In some embodiments, the one or more processors are configured to generate a bitstream $B_0$ based on a design; determine one or more design rule results (DRR) of the design based on one or more design rules that are associated with a cloud field-programmable gate array (FPGA) provider (CFP) computing entity; generate (i) a bitstream hash $H_0$ based on the bitstream $B_0$ and (ii) a DRR hash $H_{DRR}$ based on the one or more DRR; generate an encrypted bitstream based on one or more of the hash $H_0$, a CFP-side root of trust (CFPRoT) public key $DS_{Pub}$, or a VTI public key $VTI_{Pub}$; and generate a secure design rule (SDR) data object based on the DRR hash $H_{DRR}$.

BRIEF DESCRIPTION OF THE DRAWINGS

Embodiments incorporating teachings of the present disclosure are shown and described with respect to the figures presented herein.

DETAILED DESCRIPTION

Figure 1:
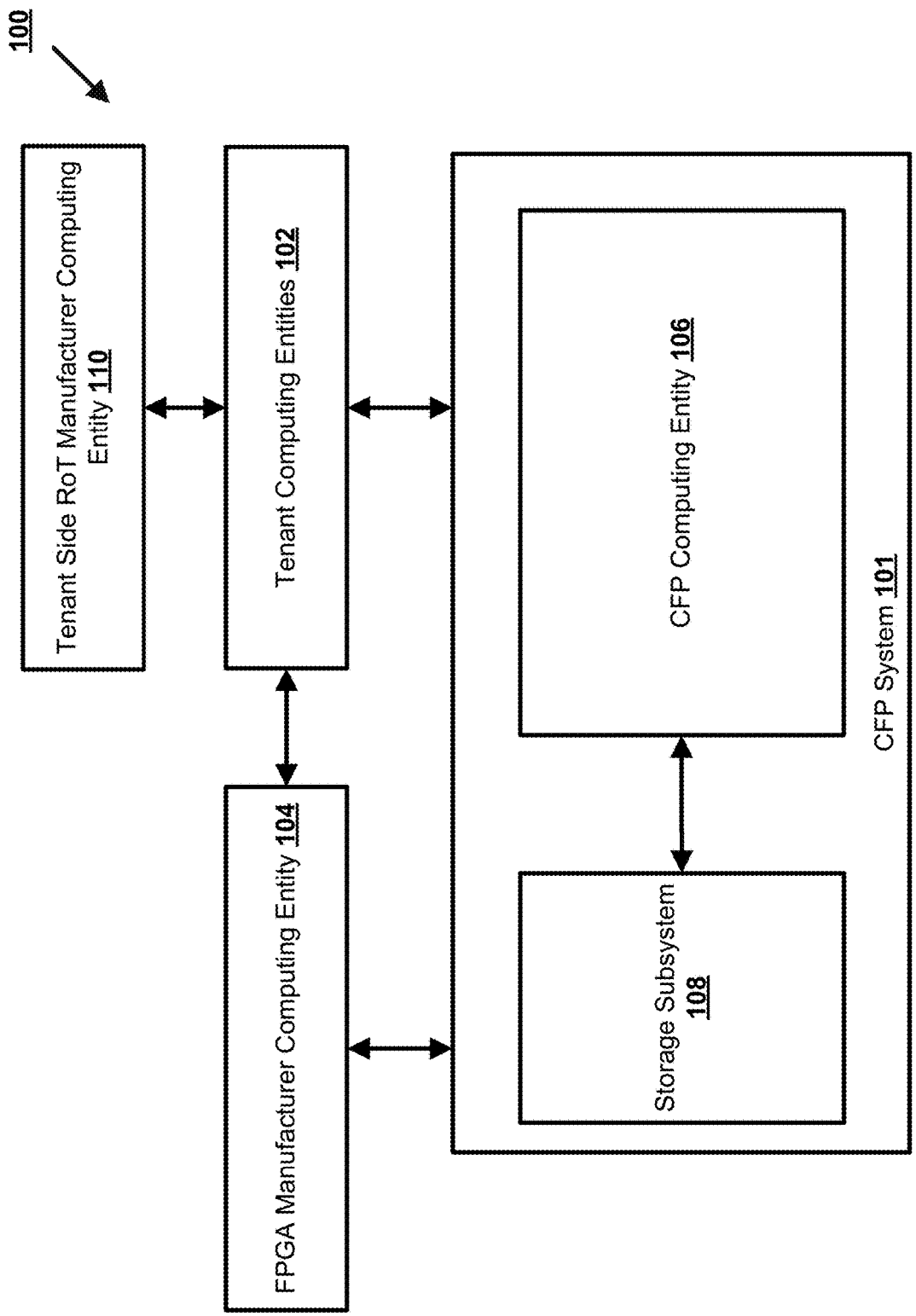
FIG. 1 illustrates an example overview of an architecture that may be used to practice embodiments of the present disclosure.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview and Example Technical Improvements

The present disclosure provides systems and methods for safeguarding against different attacks on intellectual property (IP) confidentiality and integrity, particular of hardware designs in cloud field-programmable gate array (FPGA) deployment.

FPGAs may be well-suited for accelerating computational loads, such as for search requests and deep learning. As such, it may be desirable to deploy FPGA solutions into a variety of architectures. Cloud FPGA providers (CFPs) may provide FPGA computing as a cloud resource that are accessible by cloud users or tenants. However, cloud-based FPGA deployment may have unique security challenges associated with them in addition to those of traditional cloud computing. For example, in a remote side channel analysis attack, a malicious user may upload a design to an FPGA computing resource that contains malicious circuitry such as ring oscillators and time/digital converters that may indirectly measure voltage on a circuit board. Such voltage data may be collected by the malicious user who may then analyze the voltage data to recover sensitive information from other circuits on the FPGA, such as keys used in (Rivest-Shamir-Adleman) RSA. Furthermore, deep learning may greatly increase the capabilities of such side channel attacks.

To mitigate risks associated with remote side channel analysis and other threats, CFPs may implement design rules and virus checkers to evaluate hardware designs to ensure no such malicious circuitry are made available to tenants. Such checks are typically executed on designs that are created on CFP programs and provided to tenants through the cloud. However, confidentiality of designs that run on a system controlled by the CFP may be a concern. Traditional solutions to such concerns may typically rely on trusted execution environments (TEEs) to ensure confidentiality. However, TEEs often have limits on their throughput, such as checks and compilation taking significantly longer on TEEs.

According to various embodiments of the present disclosure, systems and methods for tenant-side checking of designs for cloud FPGA deployment are provided. In some embodiments, a system may comprise two separate roots of trust (RoTs) that are configured for dually leveraged deployment (DLD), which may serve as a set of checks and balances for allowing tenants to check private or tenant-owned designs in a pseudo-TEE and ensuring that both tenants and CFPs may trust and secure designs during cloud FPGA deployment. In some embodiments, a pseudo-TEE may be implemented on tenant-side hardware using a RoT. In some embodiments, a tenant device comprises a hardware-based RoT (hereinafter referred to as a tenant-side RoT (TSRoT)). The TSRoT may be leveraged by a CFP to bootstrap trust onto the tenant's device, even when the tenant is in full control of the system. By using a pseudo-TEE for design checking, authentication activities may be performed before running an executable, shifting overhead away from actual runtime, and tenant-side hardware resources may be made available for usage. The tenant may then leverage a physical RoT on a FPGA (hereinafter referred to as a cloud FPGA provider-side root of trust (CFPRoT)) that is provided by the CFP for programming by the tenant to ensure confidentiality and security of one or more designs that may be deployed by the tenant on the FPGA. The CFPRoT may be configured to compare a hash of a bitstream that is provided by the CFP against a tenant-supplied bitstream to confirm a match before programming the FPGA. In some embodiments, a DLD established with the disclosed system may ensure that both parties (the tenant and the CFP) are satisfied with designs and protected against malicious behavior by both the tenant and CFP.

Example Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

Example System Architecture

FIG. 1 is a schematic diagram of an example architecture 100 for securing hardware designs deployed in cloud FPGA environments. The architecture 100 includes a CFP system 101 that may be configured to receive FPGA programming requests from tenant computing entities 102, process the FPGA programming requests, and facilitate programming of FPGAs by the tenant computing entities 102. For each request, the CFP system 101 may be further configured to download an executable from the FPGA manufacturer computing entity 104 and create a bootable image (BI) comprising a minimal operating system with the executable and tools to facilitate bitstream processing and checking operations. The CFP system 101 may be further configured to provide the BI to the requesting one of the tenant computing entities 102, receive a secure hash state (SHS) and an encrypted bitstream (e.g., based on verification of the BI by the requesting one of the tenant computing entities 102 using a TSRoT provided by tenant-side RoT manufacturer computing entity 110) from the requesting one of the tenant computing entities 102, generate a recovered bitstream hash using the SHS, and send the encrypted bitstream to a CFPRoT that is associated with a FPGA computing resource to decrypt the encrypted bitstream and match the decrypted bitstream with the bitstream hash to allow programming of the FPGA computing resource with a design that is provided by the requesting one of the tenant computing entities 102.

In some embodiments, CFP system 101 may communicate with at least one of the tenant computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The CFP system 101 may include a CFP computing entity 106 and a storage subsystem 108. The CFP computing entity 106 may be configured to receive FPGA programming requests from tenant computing entities 102, process the FPGA programming requests, and facilitate programming of FPGAs by the tenant computing entities 102. For each request, the CFP computing entity 106 may be further configured to download an executable from the FPGA manufacturer computing entity 104 and create a bootable image (BI) comprising a minimal operating system with the executable and tools to facilitate bitstream processing and checking operations. The CFP computing entity 106 may be further configured to provide the BI to the requesting one of the tenant computing entities 102, receive a SHS and an encrypted bitstream (e.g., based on verification of the BI by the requesting one of the tenant computing entities 102 using a TSRoT provided by tenant-side RoT manufacturer computing entity 110) from the requesting one of the tenant computing entities 102, generate a recovered bitstream hash using the SHS, and send the encrypted bitstream to a CFPRoT that is associated with a FPGA computing resource to decrypt the encrypted bitstream and match the decrypted bitstream with the bitstream hash to allow programming of the FPGA computing resource with a design that is provided by the requesting one of the tenant computing entities 102.

The storage subsystem 108 may be configured to store input data used by the CFP computing entity 106 to perform checking and securing of hardware designs provided by tenant computing entities 102. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Example CFP Computing Entity

Figure 2:
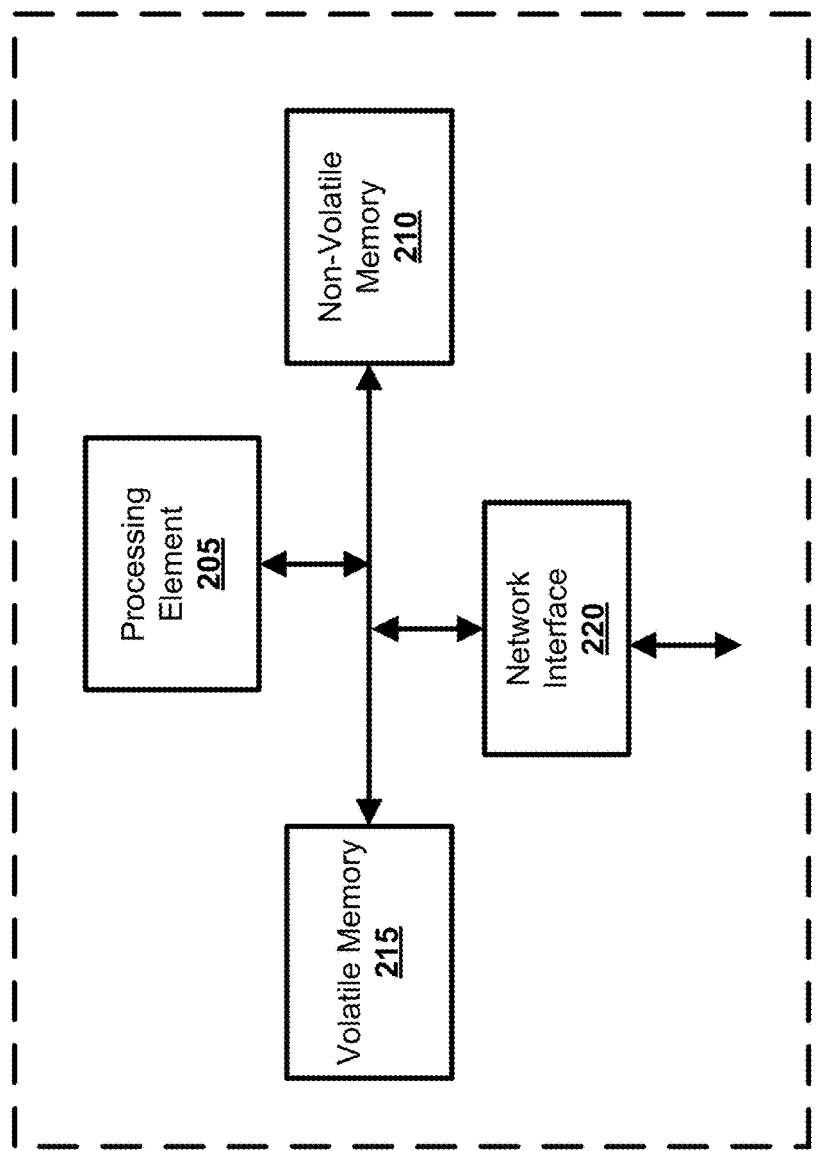
FIG. 2 illustrates an example cloud field-programmable gate array (FPGA) provider computing entity in accordance with some embodiments discussed herein.

FIG. 2 provides a schematic of a CFP computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the CFP computing entity 106 may also include one or more network interfaces 220 for communicating with various computing entities, such as tenant computing entities 102, and/or FPGA manufacturer computing entity 104.

As shown in FIG. 2, in one embodiment, the CFP computing entity 106 may include, or be in communication with, one or more processing elements 205 (also referred to as processors, processing circuitry, and/or similar terms used herein interchangeably) that communicate with other elements within the CFP computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the CFP computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the CFP computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the CFP computing entity 106 with the assistance of the processing element 205 and operating system.

As indicated, in one embodiment, the CFP computing entity 106 may also include one or more network interfaces 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the CFP computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the CFP computing entity 106 may include, or be in communication with, one or more input elements, such as a keyboard input, a mouse input, a touch screen/display input, motion input, movement input, audio input, pointing device input, joystick input, keypad input, and/or the like. The CFP computing entity 106 may also include, or be in communication with, one or more output elements (not shown), such as audio output, video output, screen/display output, motion output, movement output, and/or the like.

Example FPGA Manufacturer Computing Entity

Figure 3:
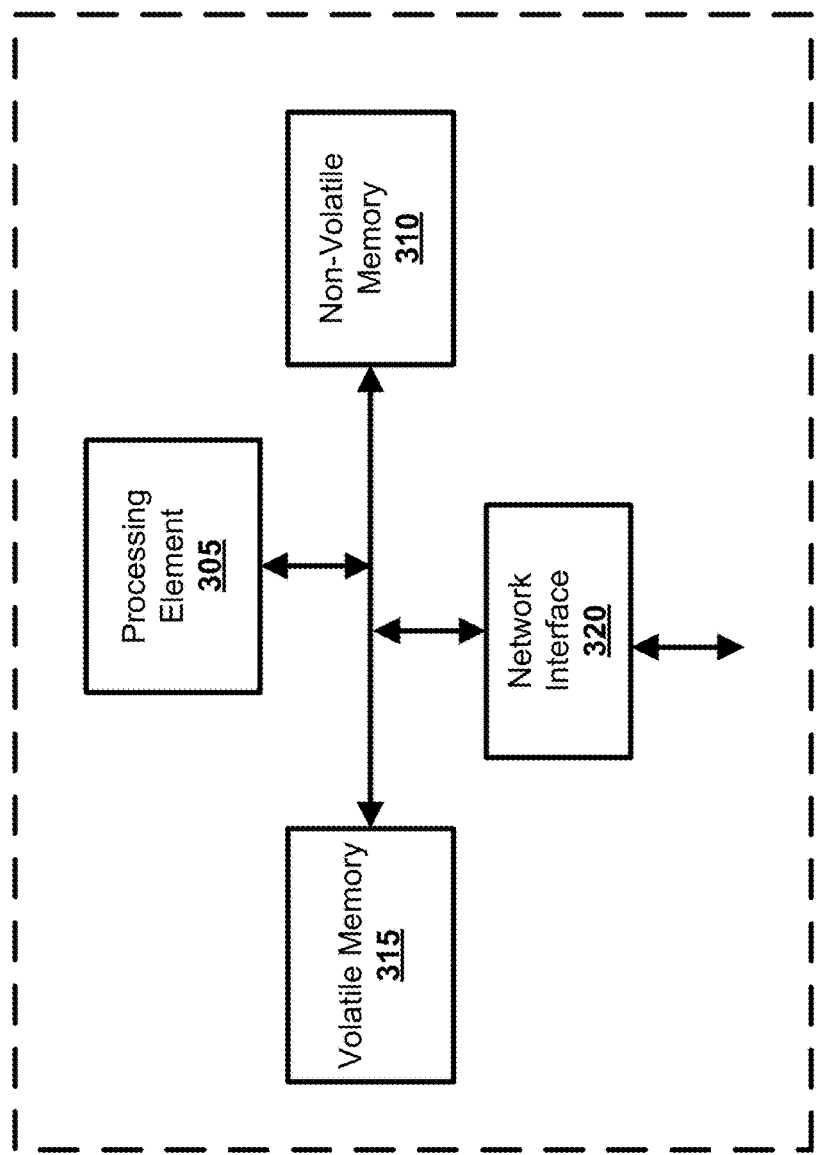
FIG. 3 illustrates an example FPGA manufacturer computing entity in accordance with some embodiments discussed herein.

FIG. 3 provides a schematic of a FPGA manufacturer computing entity 104 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the FPGA manufacturer computing entity 104 may also include one or more network interfaces 320 for communicating with various computing entities, such as CFP system 101, and/or tenant computing entities 102.

As shown in FIG. 3, in one embodiment, the FPGA manufacturer computing entity 104 may include, or be in communication with, one or more processing elements 305 (also referred to as processors, processing circuitry, and/or similar terms used herein interchangeably) that communicate with other elements within the FPGA manufacturer computing entity 104 via a bus, for example. As will be understood, the processing element 305 may be embodied in a number of different ways.

For example, the processing element 305 may be embodied as one or more complex programmable logic devices (CPLDs), microprocessors, multi-core processors, coprocessing entities, application-specific instruction-set processors (ASIPs), microcontrollers, and/or controllers. Further, the processing element 305 may be embodied as one or more other processing devices or circuitry. Thus, the processing element 305 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the FPGA manufacturer computing entity 104 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 310, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the FPGA manufacturer computing entity 104 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 315, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the FPGA manufacturer computing entity 104 with the assistance of the processing element 305 and operating system.

As indicated, in one embodiment, the FPGA manufacturer computing entity 104 may also include one or more network interfaces 320 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the FPGA manufacturer computing entity 104 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the FPGA manufacturer computing entity 104 may include, or be in communication with, one or more input elements, such as a keyboard input, a mouse input, a touch screen/display input, motion input, movement input, audio input, pointing device input, joystick input, keypad input, and/or the like. The FPGA manufacturer computing entity 104 may also include, or be in communication with, one or more output elements (not shown), such as audio output, video output, screen/display output, motion output, movement output, and/or the like.

Example Tenant-Side Root of Trust (RoT) Manufacturer Computing Entity

Figure 4:
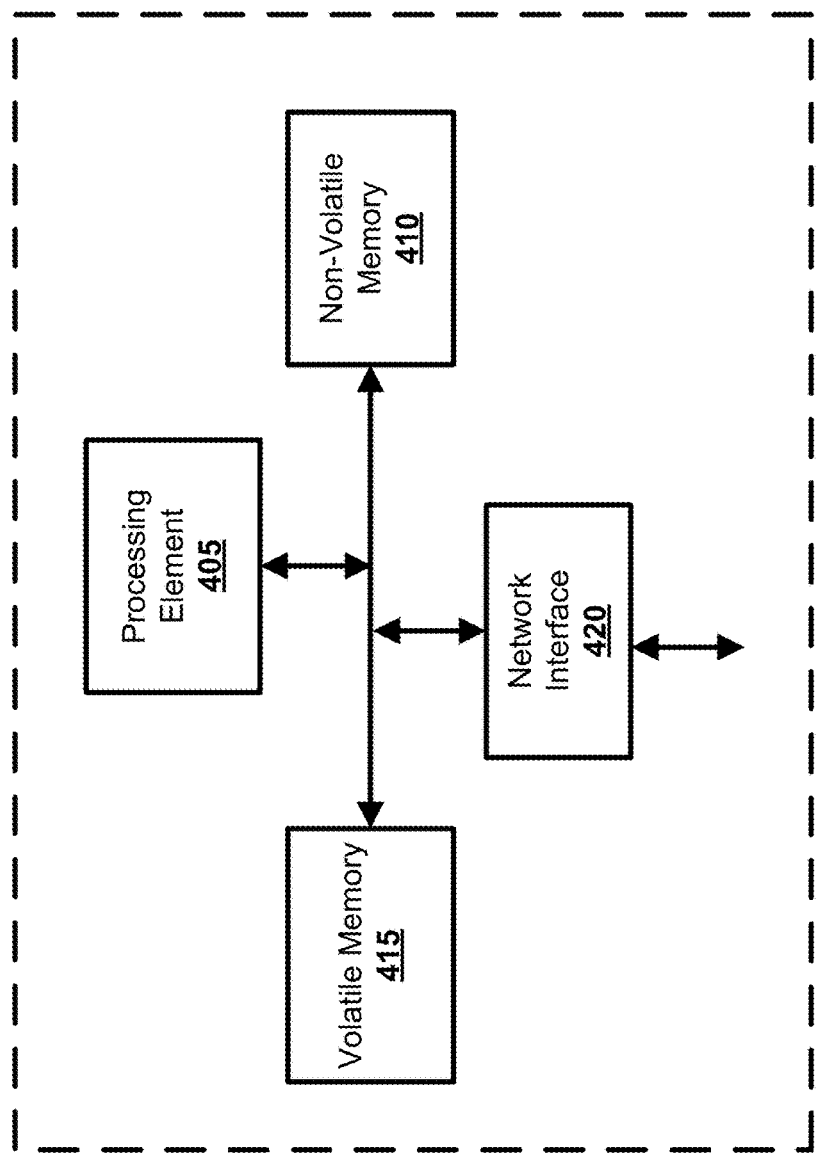
FIG. 4 illustrates an example tenant-side root of trust manufacturer computing entity in accordance with some embodiments discussed herein.

FIG. 4 provides a schematic of a tenant-side RoT manufacturer computing entity 110 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the tenant-side RoT manufacturer computing entity 110 may also include one or more network interfaces 420 for communicating with various computing entities, such as tenant computing entities 102.

As shown in FIG. 4, in one embodiment, the tenant-side RoT manufacturer computing entity 110 may include, or be in communication with, one or more processing elements 405 (also referred to as processors, processing circuitry, and/or similar terms used herein interchangeably) that communicate with other elements within the tenant-side RoT manufacturer computing entity 110 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present disclosure when configured accordingly.

In one embodiment, the tenant-side RoT manufacturer computing entity 110 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the tenant-side RoT manufacturer computing entity 110 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the tenant-side RoT manufacturer computing entity 110 with the assistance of the processing element 405 and operating system.

As indicated, in one embodiment, the tenant-side RoT manufacturer computing entity 110 may also include one or more network interfaces 420 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the tenant-side RoT manufacturer computing entity 110 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the tenant-side RoT manufacturer computing entity 110 may include, or be in communication with, one or more input elements, such as a keyboard input, a mouse input, a touch screen/display input, motion input, movement input, audio input, pointing device input, joystick input, keypad input, and/or the like. The tenant-side RoT manufacturer computing entity 110 may also include, or be in communication with, one or more output elements (not shown), such as audio output, video output, screen/display output, motion output, movement output, and/or the like.

Example Tenant Computing Entity

Figure 5:
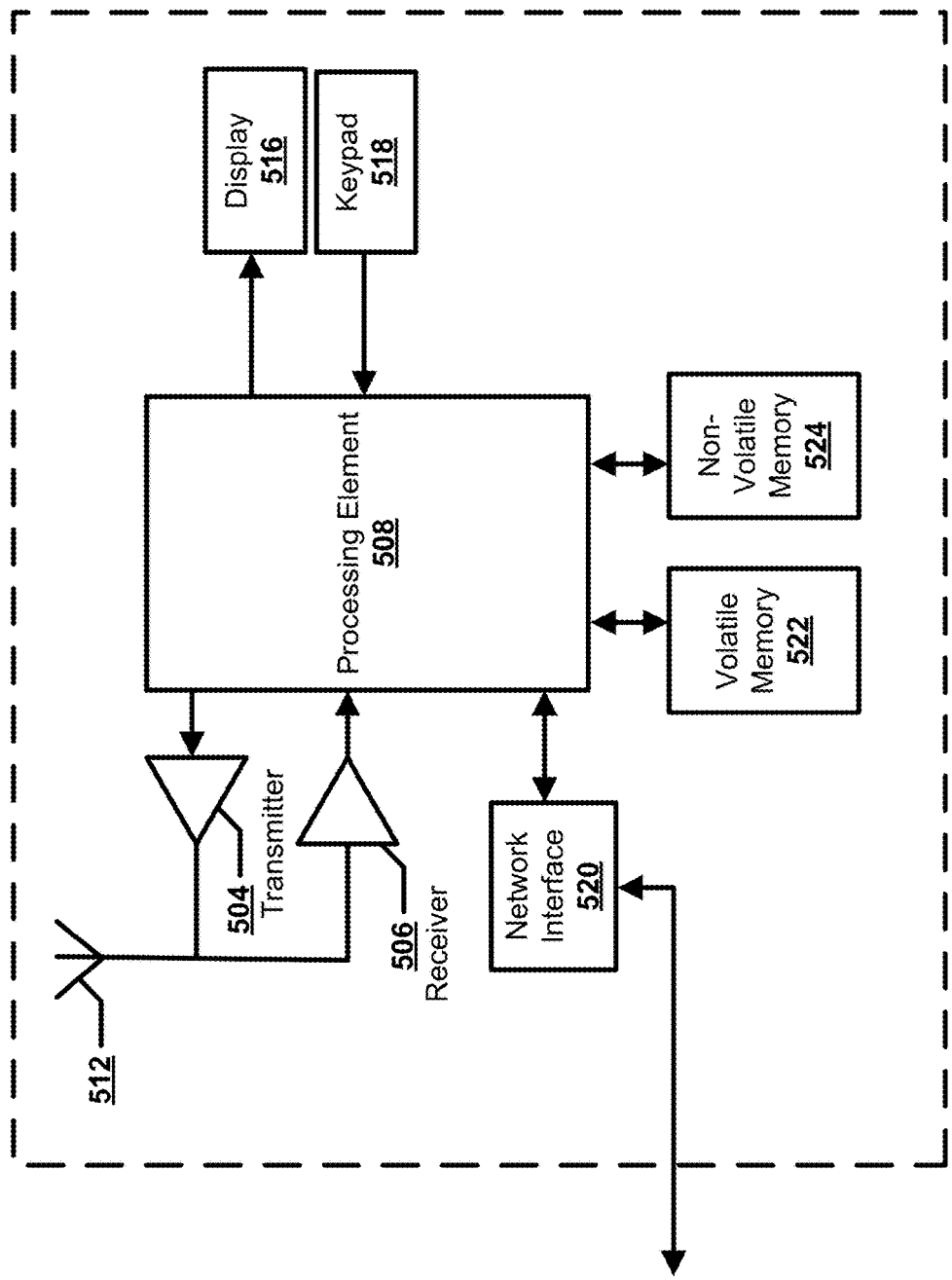
FIG. 5 illustrates an example client computing entity in accordance with some embodiments discussed herein.

FIG. 5 provides an illustrative schematic representative of a tenant computing entity 102 that may be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Tenant computing entities 102 may be operated by various parties. As shown in FIG. 5, the tenant computing entity 102 may include an antenna 512, a transmitter 504 (e.g., radio), a receiver 506 (e.g., radio), and a processing element 508 (e.g., CPLDs, microprocessors, multi-core processors, coprocessing entities, ASIPs, microcontrollers, and/or controllers) that provides signals to and receives signals from the transmitter 504 and receiver 506, correspondingly.

The signals provided to and received from the transmitter 504 and the receiver 506, correspondingly, may include signaling information/data in accordance with air interface standards of applicable wireless systems. In this regard, the tenant computing entity 102 may be capable of operating with one or more air interface standards, communication protocols, modulation types, and access types. More particularly, the tenant computing entity 102 may operate in accordance with any of a number of wireless communication standards and protocols, such as those described above. In a particular embodiment, the tenant computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the tenant computing entity 102 may operate in accordance with multiple wired communication standards and protocols, such as those described above via a network interface 520.

Via these communication standards and protocols, the tenant computing entity 102 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The tenant computing entity 102 may also download changes, add-ons, and updates, for instance, to its firmware, software (e.g., including executable instructions, applications, program modules), and operating system.

According to one embodiment, the tenant computing entity 102 may include location determining aspects, devices, modules, functionalities, and/or similar words used herein interchangeably. For example, the tenant computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the client computing entity's 102 position in connection with a variety of other systems, including cellular towers, Wi-Fi access points, and/or the like. Similarly, the tenant computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The tenant computing entity 102 may also comprise a user interface (that may include a display 516 coupled to a processing element 508) and/or a user input interface (coupled to a processing element 508). For example, the user interface may be a user application, browser, user interface, and/or similar words used herein interchangeably executing on and/or accessible via the tenant computing entity 102 to interact with, access, and/or cause display or retrieval of information/data from the CFP computing entity 106, FPGA manufacturer computing entity 104, and/or tenant-side RoT manufacturer computing entity 110, as described herein. The user input interface may comprise any of a number of devices or interfaces allowing the tenant computing entity 102 to receive data, such as a keypad 518 (hard or soft), a touch display, voice/speech or motion interfaces, or other input device. In embodiments including a keypad 518, the keypad 518 may include (or cause display of) the conventional numeric (0-9) and related keys (#, *), and other keys used for operating the tenant computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The tenant computing entity 102 may also include volatile storage or memory 522 and/or non-volatile storage or memory 524, which may be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the tenant computing entity 102. In some embodiments, the aforementioned may include a user application that is resident on the tenant computing entity 102 or accessible through a browser or other user interface for communicating with the CFP computing entity 106, FPGA manufacturer computing entity 104, tenant-side RoT manufacturer computing entity 110, and/or various other computing entities.

In some embodiments, the tenant computing entity 102 may include one or more components or functionality that are the same or similar to those of the CFP computing entity 106, FPGA manufacturer computing entity 104, or tenant-side RoT manufacturer computing entity 110, as described in greater detail above. As will be recognized, the disclosed architectures and descriptions are provided for exemplary purposes only and are not limiting to the various embodiments.

In various embodiments, the tenant computing entity 102 may be embodied as an artificial intelligence (AI) computing entity. Accordingly, the tenant computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Example System Operations

Various embodiments of the present disclosure describe steps, operations, processes, methods, functions, and/or the like for securing hardware designs deployed in cloud FPGA environments. For example, CFPs may comprise cloud computing providers that offer FPGA computing resources to tenants. As such, tenants may conveniently apply FPGA-based hardware acceleration to specific applications by procuring FPGA units as a cloud service. Tenants may program FPGA units to execute specific applications through the cloud by deploying hardware designs to the FPGA units.

Despite the benefits provided by deploying FPGA computing through the cloud, threats to both tenants and CFPs may exist. For example, malicious circuitry/programming may be inserted into cloud FPGA computing resources by tenants, either knowingly or unknowingly, to carry out remote side channel or denial-of-service attacks. That is, tenants may deploy designs to one or more shared cloud FPGA computing resources that include circuitry that causes physical damage or breaches of integrity or confidentiality of other designs that may be later deployed to the same one or more shared cloud FPGA computing resources. To prevent such damage or breaches, CFPs may comprise design rule checks and virus scanners that examine designs to ensure that malicious circuits are not included in designs that are deployed to cloud FPGA computing resources provided by the CFPs. However, if given foreknowledge of specific checks designs may be subjected to, malicious actors may be able to operate around such checks.

Furthermore, in order to run design rule checks, CFPs may be allowed to have access to raw designs, which may raise concerns of confidentiality on the tenant side. For example, CFPs may steal tenant designs for reuse or resell, e.g., IP piracy. Allowing CFPs to access raw designs may also extend beyond confidentiality concerns. In particular, CFPs may add malicious circuitry to designs that affect performance during critical junctions. As such, tenants may prefer or insist that designs owned by the tenants are deployed to cloud FPGA computing resources unmodified but yet obscured from CFPs. Accordingly, balancing design confidentiality with a CFP's need to detect malicious circuitry may pose security and trust issues.

According to various embodiments of the present disclosure, a cloud FPGA-embedded CFPRoT and a DLD may together provide a sophisticated web of interconnections that serve as a set of checks and balances to ensure that two parties, such as a tenant and a CFP, may establish mutual trust during cloud FPGA deployment.

In some embodiments, a FPGA manufacturer computing entity 104 (e.g., that is associated with a FPGA manufacturer or vendor), a CFP system 101 (e.g., that is associated with a CFP), one or more tenant computing entities 102 (e.g., that are associated with one or more tenants), and a tenant-side RoT manufacturer computing entity 110 may serve various functions in cloud FPGA deployments.

A FPGA manufacturer or vendor may comprise a party that creates physical FPGA units. The FPGA manufacturer or vendor may also provide a CFPRoT instance on each cloud FPGA unit to act as a RoT. In some embodiments, a RoT may comprise hardware, firmware, and/or software components that perform critical security functions and may provide a foundational source of trust to ensure security within a cryptographic system. The CFPRoT may comprise an interface to a programmable logic on a FPGA for both programming and verification. The FPGA manufacturer or vendor may burn a CFPRoT private asymmetric key $DS_{Priv}$ into each FPGA during manufacturing and create a matching public key $DS_{Pub}$ that is stored with the FPGA manufacturer computing entity 104. The FPGA manufacturer computing entity 104 may also store a FPGA manufacturer public key, $FM_{Pub}$, and a corresponding FPGA manufacturer private key $FM_{Priv}$.

In some embodiments, the FPGA manufacturer computing entity 104 may be configured to maintain a lookup service that returns the matching public key $DS_{Pub}$ when provided or queried with a CFPRoT identifier (DSID). The FPGA manufacturer computing entity 104 may also be configured to store an executable as well as generate a hash $H_{exec}$ of a publicly available executable. The executable may comprise an executable public key $E_{Pub}$ from a CFP that is hard coded into the executable along with an executable private key $E_{Priv}$ and executable identifier (EID). The FPGA manufacturer computing entity 104 may be further configured to return the matching public key $E_{Pub}$ when provided (or queried) with an EID.

A CFP may comprise a CFP computing entity 106 that owns or obtains FPGA units created by one or more FPGA manufacturers or vendors. The FPGA units may be made available and provided to tenants for programming (e.g., deployment of designs) by generating and allocating FPGA units to tenant computing entities 102. CFP computing entity 106 may be configured to create a virtual tenant instance (VTI) and enable communications between the VTI, a tenant (via a tenant computing entity 102), and one or more FPGA units that are associated with the CFP computing entity 106 for programming. The VTI may comprise a software cloud instance of a full operating system (OS). The CFP computing entity 106 may be further configured to download an executable from the FPGA manufacturer computing entity 104 and create a bootable image of the executable, which may comprise a minimal OS. In some embodiments, the bootable image comprises an acceptable hash states (AHS) list that is encrypted for a TSRoT on a tenant computing entity 102. The CFP computing entity 106 may be further configured to maintain a list of design rules that is used to determine design compliance and detect malicious circuitry. The CFP computing entity 106 may be further configured to determine an expected result of an executable to ensure a design passes the design rules and a hash of the executable on the bootable image is acceptable. The CFP computing entity 106 may also be configured to maintain a list of approved hardware, for example, that is capable of detecting or mitigating bus snooping, to run the bootable image on.

A tenant may comprise a party (e.g., tenant computing entities 102) that is allowed to place a design on a FPGA that is provided to the tenant by a CFP as a cloud resource via CFP computing entity 106. For example, the tenant may create a hardware design and deploy the hardware design from one or more of the tenant computing entities 102 to a cloud FPGA computing resource via the CFP computing entity 106. Tenant computing entities 102 may comprise hardware-based TSRoT that is provided by the tenant-side RoT manufacturer computing entity 110. The tenant computing entities 102 may be configured to communicate with the CFP computing entity 106 and FPGA manufacturer computing entity 104 server to establish a tenant public/private key pair $IT_{Pub}$, $IT_{Priv}$.

The tenant-side RoT manufacturer computing entity 110 may be configured to generate an ID for a public key lookup service, and create TSRoTs (e.g., for tenant computing entities 102) that are capable of (i) storing and using a TSRoT private key $TSRoT_{Priv}$, (ii) performing asymmetric encryption, (iii) calculating the hash of programs to be executed, (iv) maintaining a running hash state, and (v) accepting an initial vector to use when starting the running hash state. A TSRoT may also be able to shut down execution of a bootable image on tenant computing entities 102 if an illegal hash state is entered.

Figure 6:
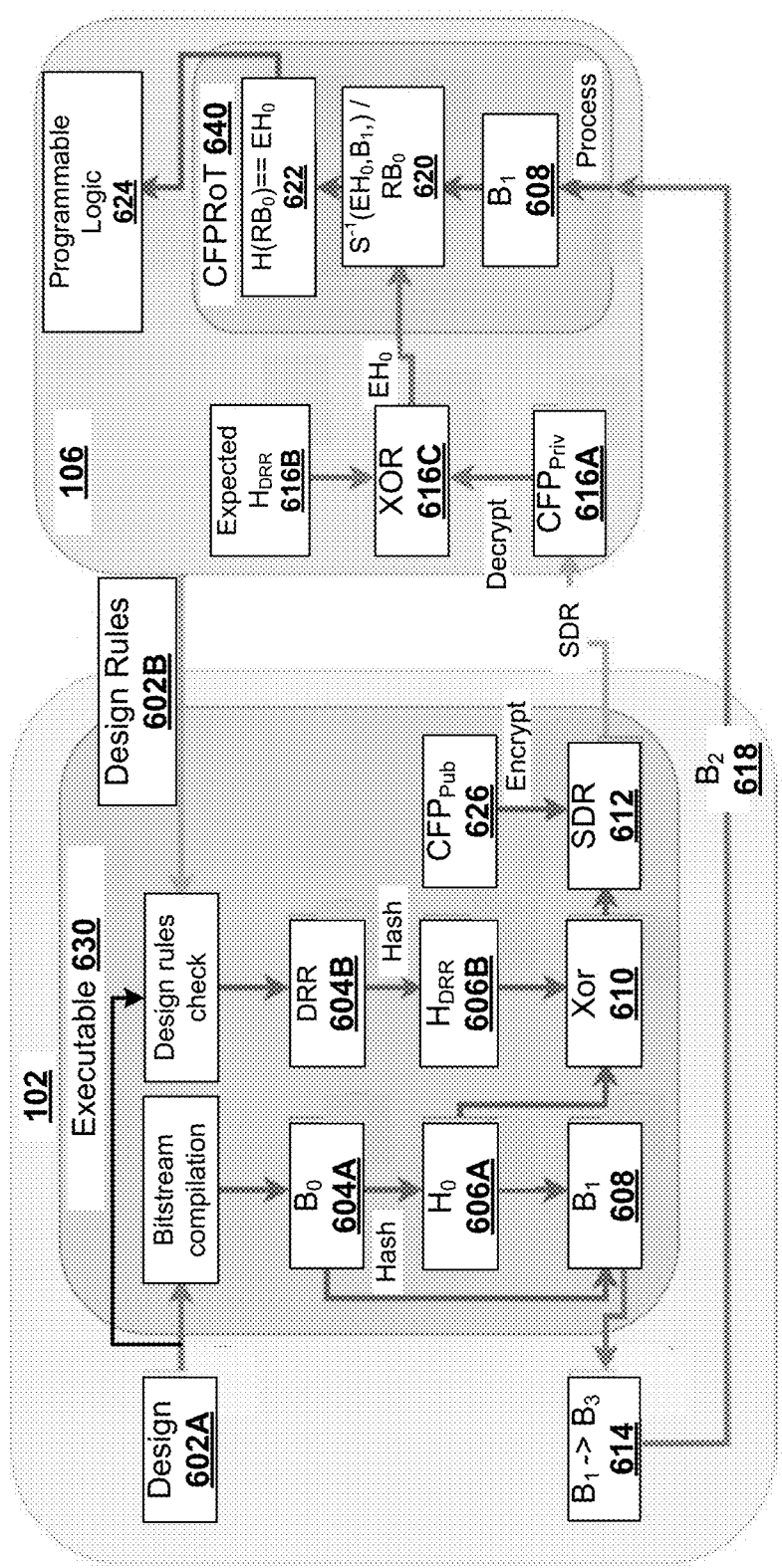
FIG. 6 illustrates an overview data flow diagram of a portion of an example cloud platform system for establishing trust during cloud FPGA deployment in accordance with some embodiments discussed herein.

FIG. 6 depicts an overview data flow diagram of a portion of an example cloud platform system for establishing trust during cloud FPGA deployment. A tenant computing entity 102 may comprise hardware configured to execute an executable 630. The executable 630 may comprise an executable code, file, or program that causes tenant computing entity 102 to perform bitstream creation and processing operations. Executable 630 may receive a design 602A from, for example, another application or process on tenant computing entity 102. Design 602A may comprise a hardware design for deployment to a FPGA unit provided via a CFP computing entity 106. The executable 630 may be further provided with design rules 602B from CFP computing entity 106. Design rules 602B may comprise design rules and virus checkers to evaluate hardware designs to ensure no such malicious circuitry are made available to tenants. The executable 630 may be received from FPGA manufacturer computing entity 104 onto tenant computing entity 102.

The executable 630 uses design 602A to generate bitstream $B_0$ 604A via bitstream compilation and uses design rules 602B to determine design rule results (DRR) 604B of a design rules check. The executable 630 then hashes $B_0$ 604A to create $H_0$ 606A and hashes DRR 604B to create $H_{DRR}$ 606B. The executable 630 symmetrically encrypts $B_0$ 604A with $H_0$ 606A as the key, creating $B_1$ 608. The executable 630 further performs an exclusive or (XOR) operation with $H_0$ 606A and $H_{DRR}$ 606B to create XOR result 610. The executable 630 then encrypts XOR result 610 with a CFP public key ($CFP_{Pub}$ 626) of the CFP computing entity 106 to create secure design rules (SDR) 612. SDR 612 may be transmitted from the executable 630 to CFP computing entity 106.

Tenant computing entity 102 may further asymmetrically encrypt $B_1$ 608 with a CFPRoT public key $DS_{Pub}$ that is associated with CFPRoT 640 (of a FPGA unit provided by CFP computing entity 106) to generate $B_2$ 618 which may be further double asymmetrically encrypted with (i) a tenant private key $IT_{Priv}$ that is associated with the tenant computing entity and (ii) a VTI public key $VTI_{Pub}$ that is associated with a VTI to generate $B_3$ 614. $B_3$ 614 is transmitted from tenant computing entity 102 to CFPRoT 640 of a FPGA on CFP computing entity 106.

CFP computing entity 106 receives (from tenant computing entity 102) and decrypts SDR 612 with CFP private key $CFP_{Priv}$ 616A and performs an XOR operation on the decrypted SDR 612 with an expected DRR hash $H_{\bar{D}RR}$ 616B to generate an expected bitstream hash $EH_0$ 616C. The CFP computing entity 106 receives (from tenant computing entity 102) and converts $B_3$ 614 back into $B_2$ 618 by sending $B_3$ 614 to a VTI on the CFP computing entity 106. The VTI may then decrypt $B_3$ 614 with VTI private key $VTI_{Priv}$ to determine $B_2$ 618 which is sent to and received by CFPRoT 640. CFPRoT 640 decrypts $B_2$ 618 with its private key $DS_{Priv}$ to determine $B_1$ 608. $B_1$ 608 is decrypted by the CFPRoT 640 with the expected bitstream hash $EH_0$ 616C to generate a recovered bitstream $RB_0$ 620. A comparison (622) between a hash of $RB_0$ 620 and the expected bitstream hash $EH_0$ 616C is made by CFPRoT 640. If the hashes match, CFPRoT 640 programs, via programmable logic 624, the FPGA unit with $RB_0$ 620. Otherwise, CFPRoT 640 prohibits programming of the FPGA unit with $RB_0$ 620.

Figure 7:
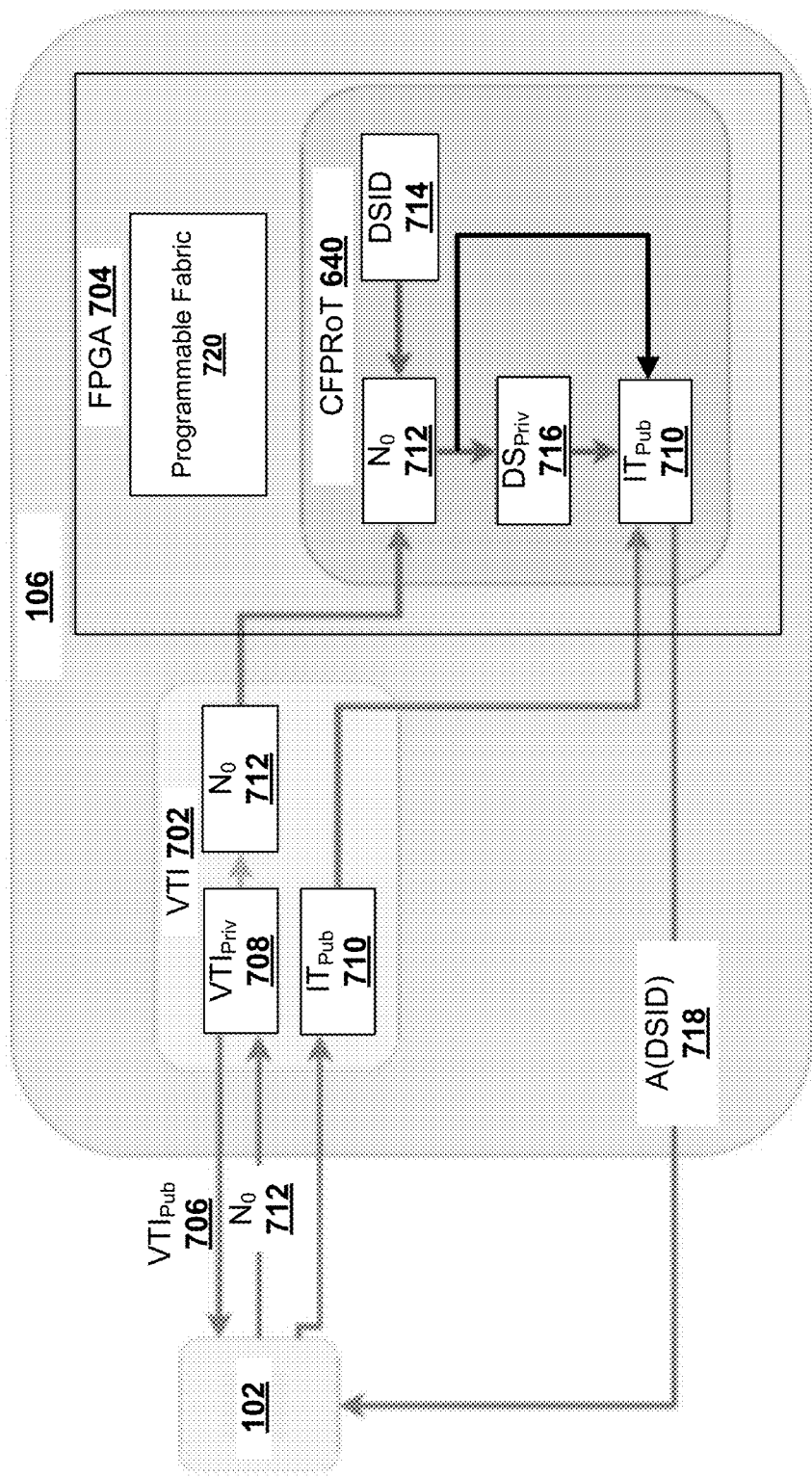
FIG. 7 depicts a data flow diagram of a portion of an example cloud platform system for establishing a virtual tenant instance and a cloud FPGA provider-side root of trust (CFPRoT) during cloud FPGA deployment in accordance with some embodiments discussed herein.

FIG. 7 depicts a data flow diagram of an example cloud platform system during initialization of a pseudo-TEE for cloud FPGA deployment. The tenant computing entity 102 may establish a virtual instance comprising a VTI 702 on the CFP computing entity 106. The tenant computing entity 102 generates a VTI public/private key pair ($VTI_{Pub}$ 706, $VTI_{Priv}$ 708) for the VTI 702 and sends the VTI public key $VTI_{Pub}$ 706 to the tenant computing entity 102. In response, tenant computing entity 102 returns a tenant public key $IT_{Pub}$ 710 and an initial nonce $N_0$ 712. The VTI 702 may then request an interface to a programmable fabric 720 of an FPGA 704 to program. The VTI 702 may provide the tenant public key $IT_{Pub}$ 710 along with $N_0$ 712 to the CFPRoT 640, each of which may be used to asymmetrically encrypt DSID 714 into asymmetrically encrypted DSID (A(DSID)) 718. The A(DSID) 718 may comprise $A(IT_{Pub}, [A(DS_{Priv}, N_0 \oplus DSID)])$ and $A(IT_{Pub}, N_0 \oplus DSID)$, where A(K, M) refers to asymmetric encryption of message M with key K. The CFP computing entity 106 (e.g., directly or indirectly via VTI 702) sends the A(DSID) 718 to the tenant computing entity 102.

Figure 8:
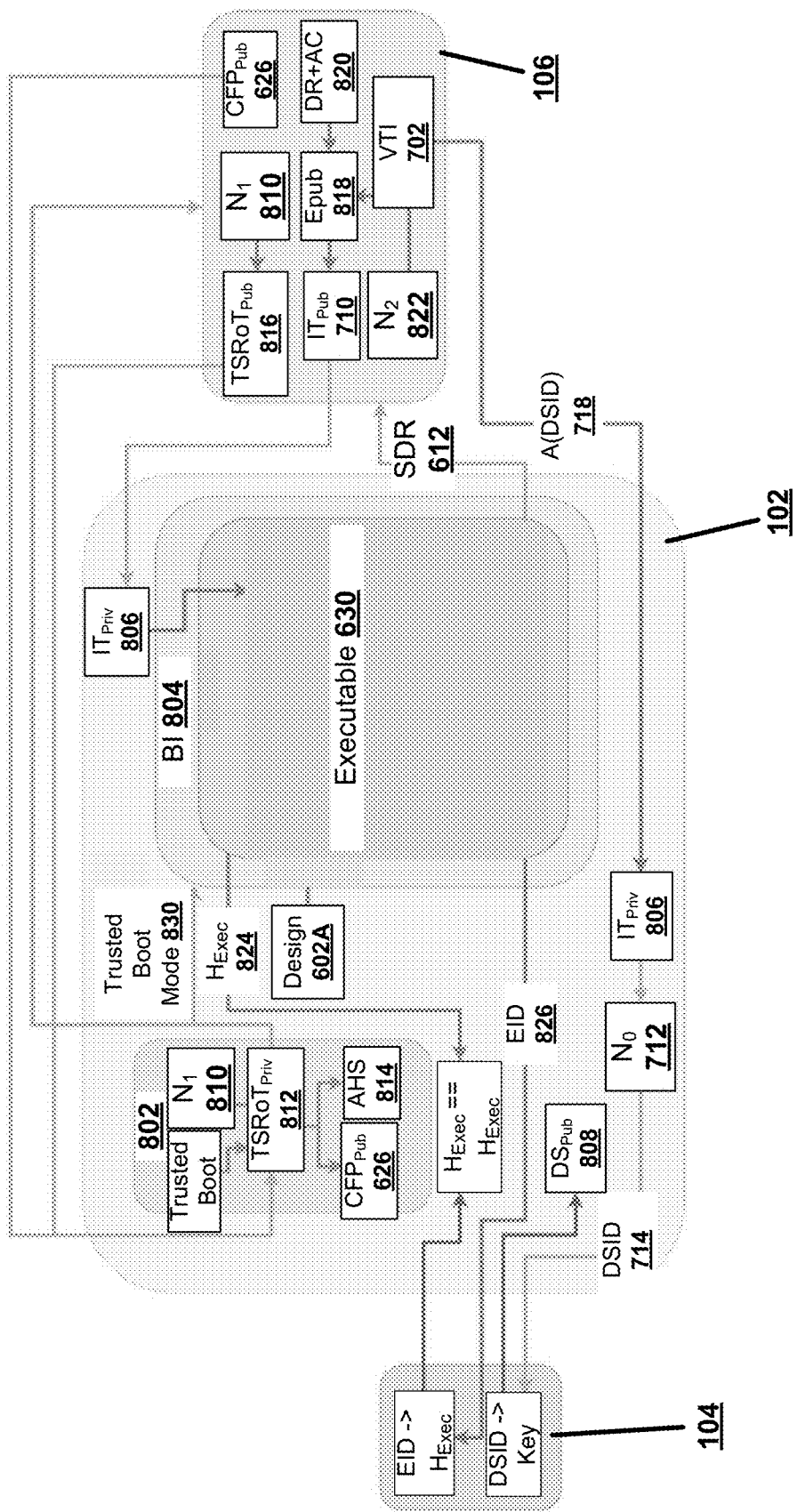
FIG. 8 depicts a data flow diagram of a portion of an example cloud platform system for establishing a pseudo-TEE system and creating a bitstream during cloud FPGA deployment in accordance with some embodiments discussed herein.

Referring to FIG. 8, the tenant computing entity 102 decrypts $A(IT_{Pub}, N_0 \oplus DSID)$ of A(DSID) 718 with tenant private key $IT_{Priv}$ 806 and performs a XOR operation with $N_0$ 712 to determine DSID 714. The tenant computing entity 102 sends the DSID 714 to the FPGA manufacturer computing entity 104 to obtain $DS_{Pub}$ 808, which tenant computing entity 102 may use to recover the DSID 714 from $A(IT_{Pub}, [A(DS_{Priv}, N_0 \oplus DSID)])$ of A(DSID) 718, along with $IT_{Priv}$, allowing tenant computing entity 102 to confirm the origin of the DSID 714 and the validity of $DS_{Pub}$ 808. Tenant computing entity 102 may download BI 804 from the CFP computing entity 106, along with a session nonce, $N_1$ 810, in the form of $A(TSRoT_{Pub}, N_1)$. Tenant computing entity 102 forwards $A(TSRoT_{Pub}, N_1)$ to TSRoT 802, which decrypts it with its private key $TSRoT_{Priv}$ 812 and stores the decrypted $N_1$ 810. CFP computing entity 106 also provides a list of AHS (AHS 814) to the TSRoT 802. The AHS 814 may be encrypted with $TSRoT_{Pub}$ 816 and decrypted by TSRoT 802 with its private key $TSRoT_{Priv}$ 812 and stored.

The tenant computing entity 102 may boot BI 804 in a trusted boot mode 830 with TSRoT 802, where any hash state not in the AHS 814 causes the image to halt operation. This effectively creates a pseudo-TEE on the tenant computing entity 102. A TEE may refer to an enclave environment which provides a secure execution platform for security sensitive applications and hardware block that are intentionally isolated from normal execution environment. That is, applications that are executed in a TEE are separate from normal execution environment and may only communicate through secure communication protocols. Tenant computing entity 102 uses TSRoT 802 to check the hashes of all programs in the BI 804, in particular, the executable 630 is checked against a true hash value given by FPGA manufacturer computing entity 104. To check the hash of executable 630 ($H_{Exec}$ 824), tenant computing entity 102 queries the executable 630 for its self-signed EID 826, which tenant computing entity 102 provides to FPGA manufacturer computing entity 104 for a true hash value for comparison with $H_{Exec}$ 824.

Once the validity of all programs on the BI 804 are ensured, tenant computing entity 102 may begin creating its bitstream. The CFP computing entity 106 may obtain $E_{Pub}$ 818 for the EID 826 (e.g., by querying the FPGA manufacturer computing entity 104). Once confirming that BI 804 was started in trusted boot mode 830, the CFP computing entity 106 may send DR+AC 820 (that comprises a combination of design rules 602B along with a few session-specific arbitrary checks (AC)), which acts as a nonce for the design rules check itself, to the BI 804 in the form of $A(E_{Pub}, DR+AC \oplus N_2)$, along with a second nonce $N_2$ 822 in the form of $A(E_{Pub}, N_2)$. The tenant computing entity 102 may then send designs for cloud FPGA deployment on CFP computing entity 106 to executable 630.

Figure 9:
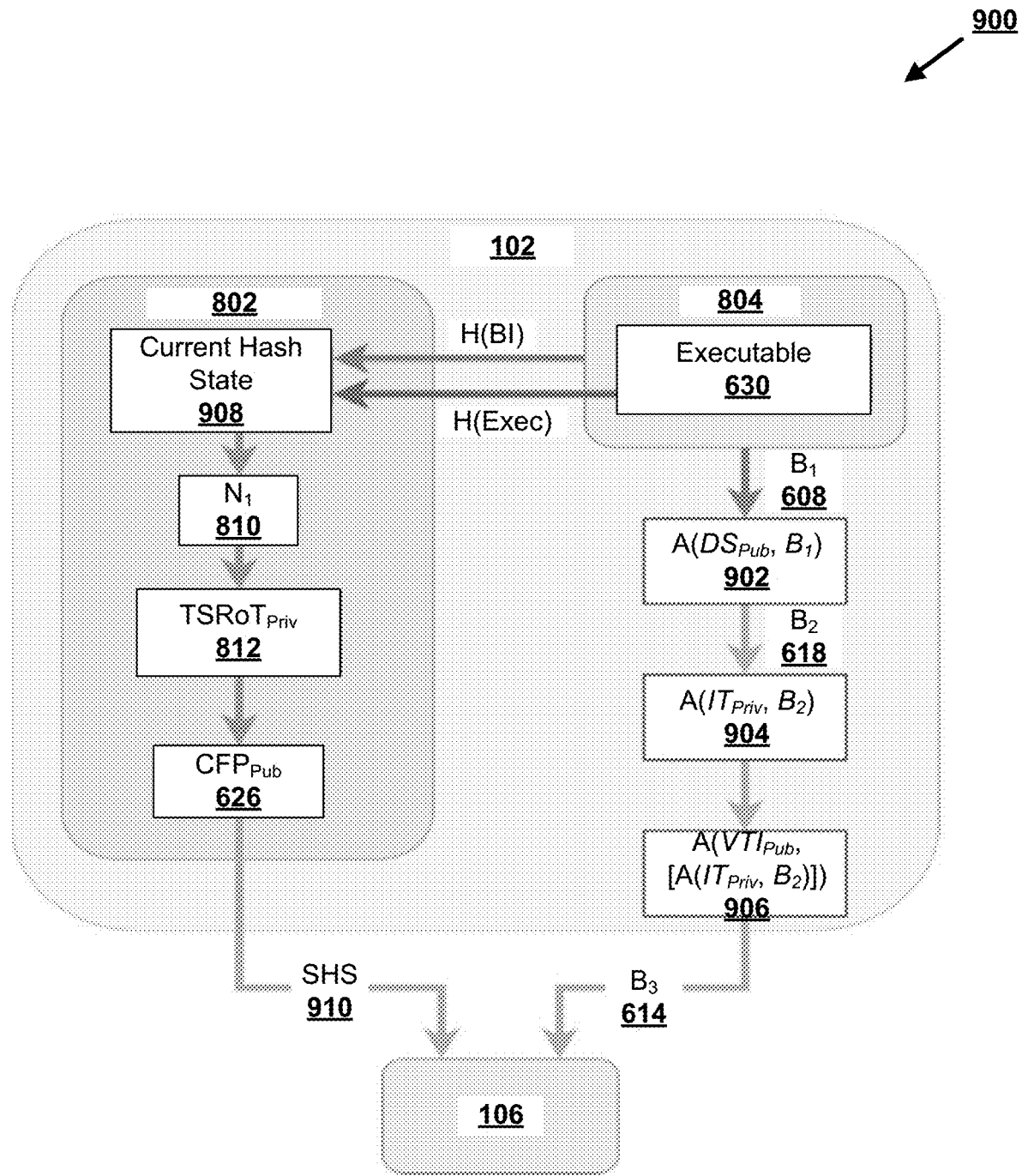
FIG. 9 depicts a depicts a data flow diagram of a portion of an example cloud platform system for generating a secure hash state and encryption of a bitstream in accordance with some embodiments discussed herein.

Referring to FIG. 9, the tenant computing entity 102 performs (i) an asymmetric encryption on a first encrypted bitstream $B_1$ 608 that comprises $A(DS_{Pub}, B_1)$ 902 to generate $B_2$ 618 and (ii) a double asymmetric encryption on $B_2$ 618 that comprises $A(VTI_{Pub}, [A(IT_{Priv}, B_2)])$ to generate $B_3$ 614. The tenant computing entity 102 then queries the TSRoT 802 for a current hash state 908, which is XORed with session nonce $N_1$ 810, before self-signing with $TSRoT_{Priv}$ 812 and encrypting with the $CFP_{Pub}$ 626 to generate a SHS 910 that may be provided to the tenant computing entity 102 along with the encrypted bitstream $B_3$ 614. At this stage, the tenant computing entity 102 may use a prior compiled design made outside of BI 804 to generate bitstream hash $H_0$ 606A and thus bitstream $B_0$ 604A for testing and validation but cannot modify it without being detected.

Figure 10:
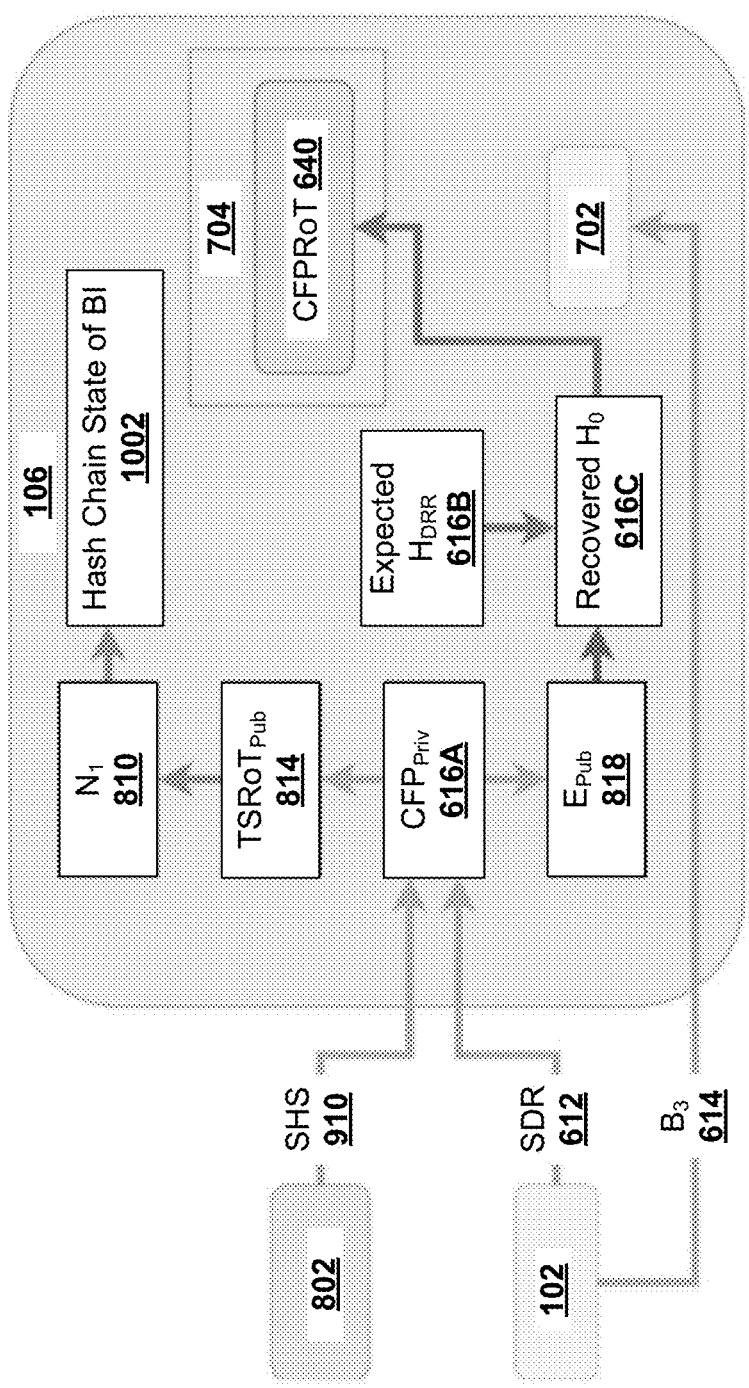
FIG. 10 depicts a data flow diagram of a portion of an example cloud platform system for verifying design rules results and hash state in accordance with some embodiments discussed herein.

Referring to FIG. 10, the tenant computing entity 102 then sends the SHS 910 along with $B_3$ 614 and the SDR 612 to the CFP computing entity 106. The CFP computing entity 106 performs $A^{-1}(CFP_{Priv}, [A^{-1}(TSRoT_{Pub}, SHS)]) \oplus N_1$ to determine the raw hash chain state of BI 804 (1002), which it confirms is correct, where $A^{-1}(K, C)$ refers to decryption of asymmetrically encrypted ciphertext C with key K. The CFP computing entity 106 then hashes expected DRR to generate an expected DRR hash $H_{\bar{D}RR}$ 616B followed by $A^{-1}(CFP_{Priv}, [A^{-1}(E_{Pub}, SDR)]) \oplus H_{\bar{D}RR}$ to obtain $EH_0$ 616C, the expected bitstream hash. The CFP computing entity 106 also then forwards $B_3$ 614, received from the tenant computing entity 102, to the VTI 702.

Figure 11:
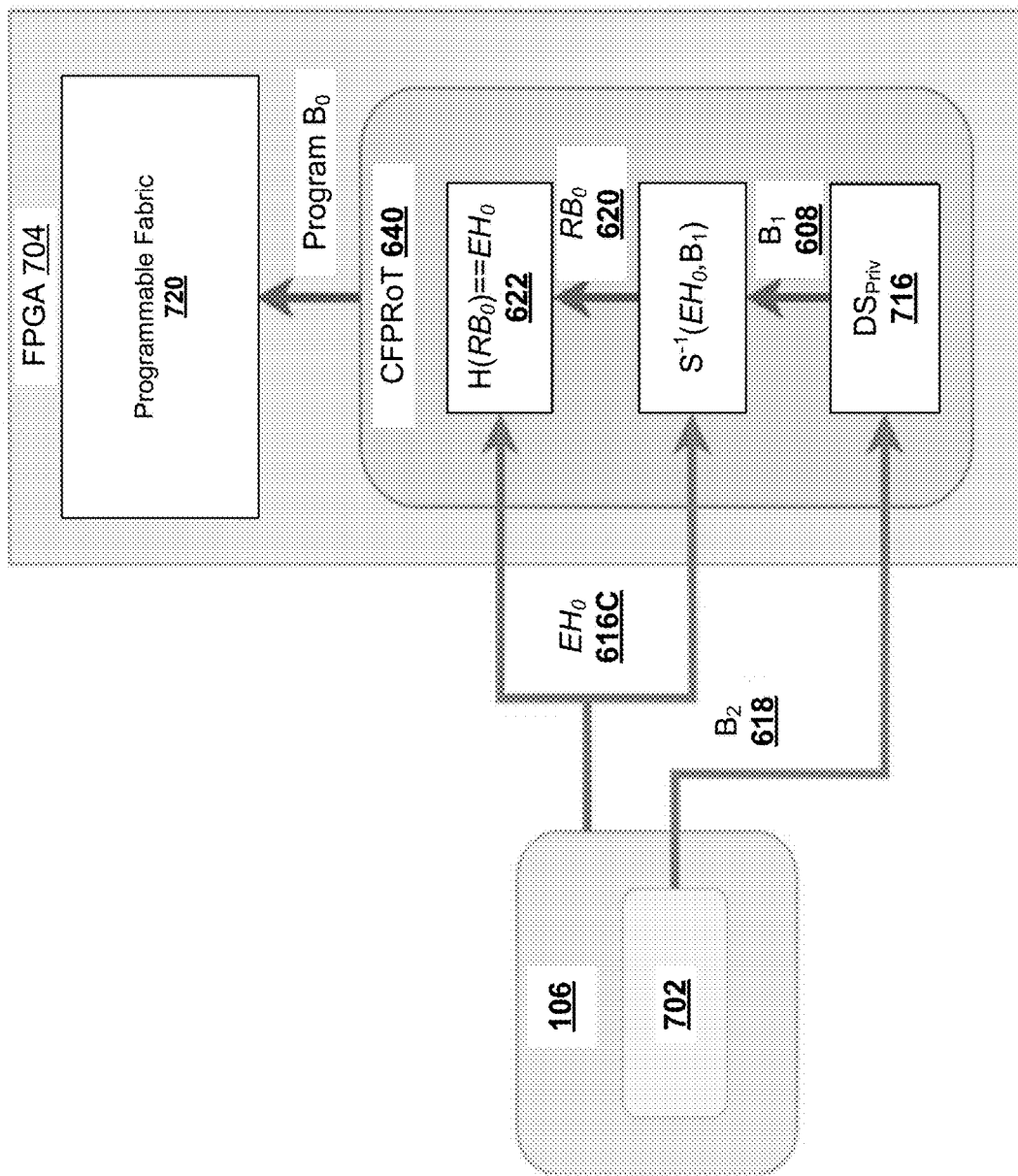
FIG. 11 depicts a data flow diagram of a portion of an example cloud platform system for programming a FPGA with a CFPRoT in accordance with some embodiments discussed herein.

Referring to FIG. 11, the VTI 702 may be configured to (i) decrypt $B_3$ 614 into $B_2$ 618 by using the VTI private key $VTI_{Priv}$ 708 and (ii) confirm a state of $B_2$ 618 by using tenant public key $IT_{Pub}$ 710. As further depicted in FIG. 11, VTI 702 provides $B_2$ 618 to the CFPRoT 640. The CFPRoT 640 may decrypt $B_2$ 618 into $B_1$ 608 by using its private key $DS_{Priv}$ 716 and query the CFP computing entity 106 for the expected bitstream hash $EH_0$ 616C. The CFPRoT 640 may perform $S^{-1}$ ($EH_0$, $B_1$) to determine the recovered bitstream $RB_0$ 620, where $S^{-1}$ (K, C) refers to symmetric decryption of symmetrically encrypted ciphertext C with key K. The CFPRoT 640 then hashes $RB_0$ 620 to generate recovered bitstream hash $H(RB_0)$ and checks it against $EH_0$ 616C. If the recovered bitstream hash $H(RB_0)$ does not equal to the expected bitstream hash $EH_0$ 616C, then the CFPRoT 640 may refuse to program the board and alert the CFP computing entity 106. As the expected bitstream hash $EH_0$ 616C is generated from the SDR 612, any deviation in the design rules results in an improper decryption and refusal to load the design 602A on the board. Accordingly, the CFPRoT 640 may program the board only when the recovered bitstream hash $H(RB_0)$ matches with the expected bitstream hash $EH_0$ 616C.

Figure 12:
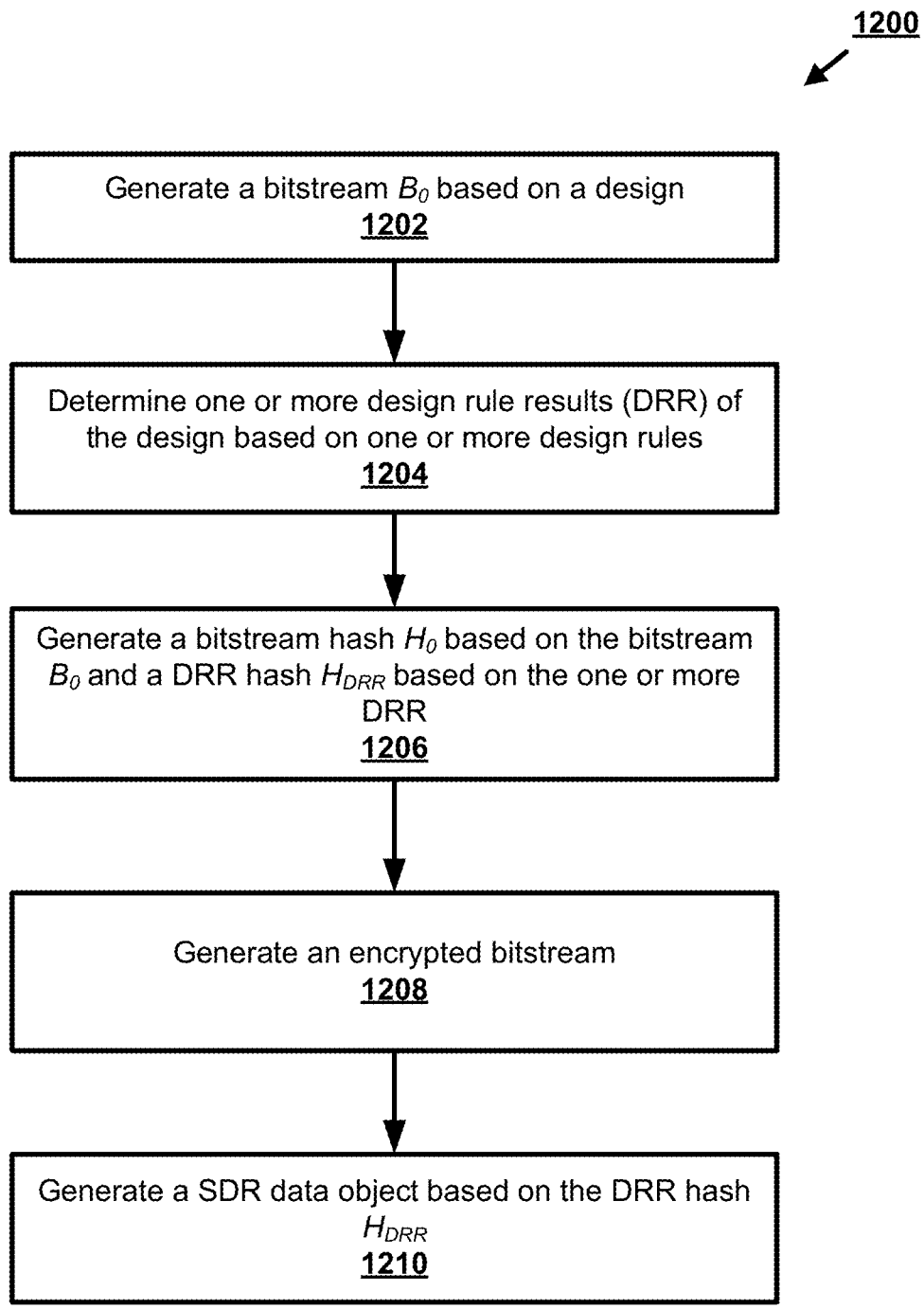
FIG. 12 is a flowchart of an example process for securing a design for deployment to a cloud FPGA computing resource according to some embodiments of the present disclosure.

FIG. 12 is a flowchart of an example process 1200 for securing a design for deployment to a cloud FPGA computing resource according to some embodiments of the present disclosure. In some embodiments, via the various steps/operations of the process 1200, one of the tenant computing entities 102 may execute an executable via a tenant-side root of trust (TSRoT) to perform various operations as described herewith with reference to the description of FIG. 12.

In some embodiments, the process 1200 begins at step/operation 1202 when a select one of the tenant computing entities 102 generates a bitstream $B_0$ based on a design to be deployed to a FPGA unit that is provided by a CFP computing entity (e.g., CFP computing entity 106). For example, the design may comprise a digital circuit design in which FPGA acceleration is desired. The FPGA unit may comprise a cloud FPGA computing resource in which the design may be deployed to by a tenant via the select one of the tenant computing entities 102.

In some embodiments, at step/operation 1204, the select one of the tenant computing entities 102 determines one or more DRR of the design based on one or more design rules that are associated with the CFP computing entity that is providing the FPGA unit. In some embodiments determining the one or more DRR comprises determining the design is in compliance with the one or more design rules. In some embodiments, the one or more design rules comprise design rules and/or virus checkers that may be used to evaluate hardware designs or detect malicious circuitry to ensure that malicious circuits are not included in designs that are deployed to cloud FPGA computing resources that are provided by the CFP computing entity.

In some embodiments, at step/operation 1206, the select one of the tenant computing entities 102 generates a bitstream hash $H_0$ based on the bitstream $B_0$ and a DRR hash $H_{DRR}$ based on the one or more DRR.

In some embodiments, at step/operation 1208, the select one of the tenant computing entities 102 generates an encrypted bitstream based on one or more of the bitstream hash $H_0$, a CFPRoT public key $DS_{Pub}$, or a VTI public key $VTI_{Pub}$. In some embodiments, generating the encrypted bitstream comprises (i) generating a first encrypted bitstream $B_1$ by encrypting the bitstream $B_0$ with the bitstream hash $H_0$, (ii) generating a second encrypted bitstream $B_2$ by asymmetrically encrypting the first encrypted bitstream $B_1$ with a CFPRoT public key $DS_{Pub}$ that is associated with a CFPRoT, (iii) generating a third encrypted bitstream $B_3$ by double asymmetrically encrypting the second encrypted bitstream $B_2$ with (a) a tenant private key $IT_{Priv}$ that is associated with the select one of the tenant computing entity 102 and (b) a VTI public key $VTI_{Pub}$ that is associated with a VTI of the CFP computing entity, and (iv) transmitting the third encrypted bitstream $B_3$ to the CFPRoT.

In some embodiments, at step/operation 1210, the select one of the tenant computing entities 102 generates a SDR data object based on the DRR hash $H_{DRR}$. In some embodiments, generating the SDR data object comprises (i) perform an exclusive or (XOR) operation with the bitstream hash $H_0$ and the DRR hash $H_{DRR}$; (ii) encrypting a XOR result associated with the XOR operation with a CFP public key $CFP_{Pub}$ that is associated with the CFP computing entity; (iii) generating a SDR data object based on the encryption of the XOR result; and (iv) transmitting the SDR data object to the CFP computing entity.

Figure 13:
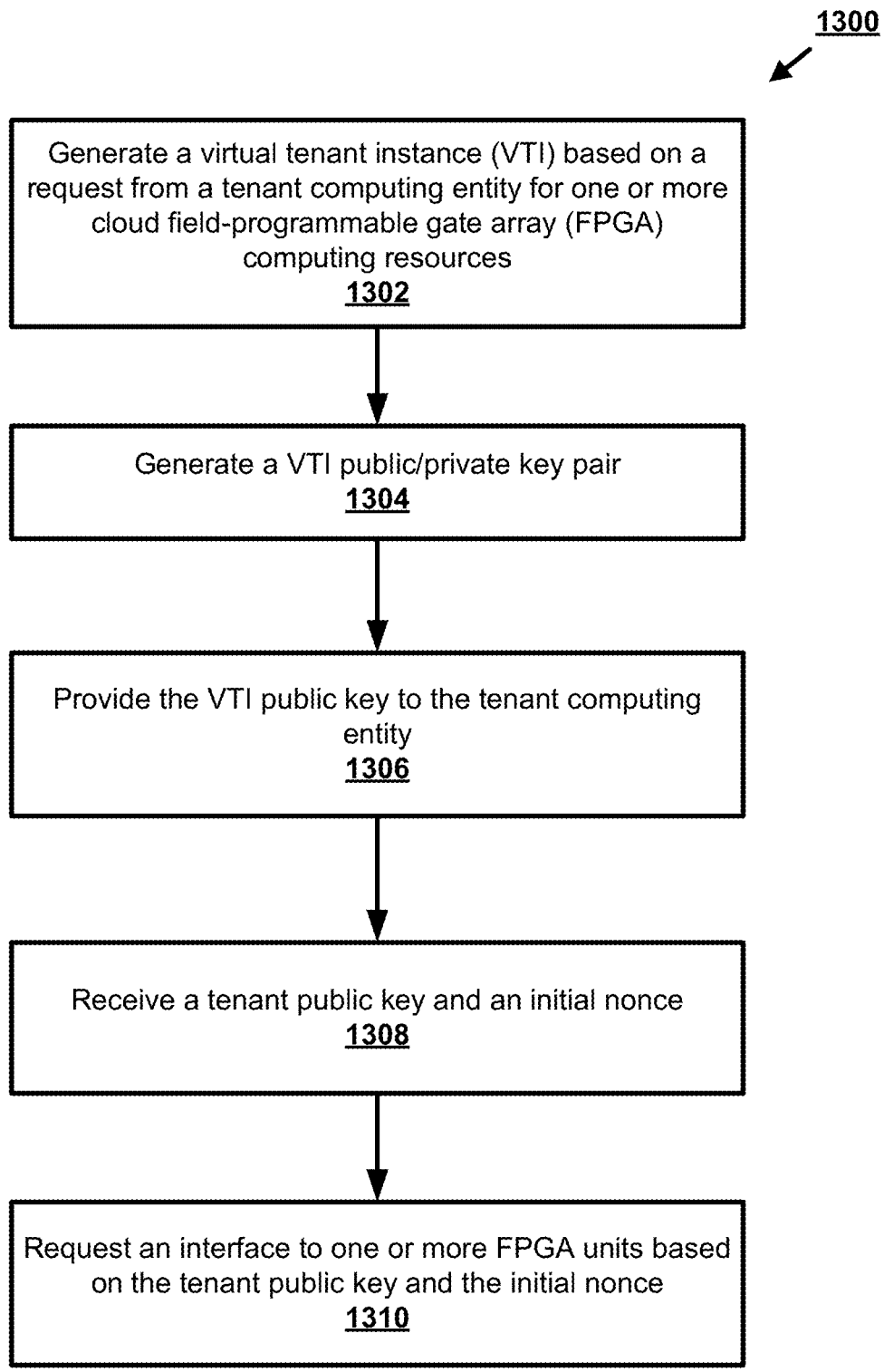
FIG. 13 is a flowchart of an example process for initializing a pseudo-TEE according to some embodiments of the present disclosure.

FIG. 13 is a flowchart of an example process 1300 for initializing a pseudo-TEE according to some embodiments of the present disclosure. In some embodiments, via the various steps/operations of the process 1300, a virtual instance is created on a CFP computing entity (e.g., CFP computing entity 106).

In some embodiments, the process 1300 begins at step/operation 1302 when the CFP computing entity 106 generates a VTI based on request from a tenant computing entity for one or more cloud FPGA computing resources. The VTI may comprise a software cloud instance of an OS that is generated on the CFP computing entity 106 or a server that is associated with the CFP computing entity 106 and coupled to one or more FPGA units. In some embodiments, the VTI is configured to facilitate communication between a tenant computing entity (e.g., one of the tenant computing entities 102 that requests the one or more cloud FPGA computing resources), a CFP computing entity 106, and the one or more FPGA units. As such, the VTI may comprise an interface that provides the tenant computing entity with access to the one or more FPGA units that are provided by the CFP computing entity 106 for programming (e.g., deployment of a design) by the tenant computing entity. In some embodiments, the VTI is further configured to allow the tenant computing entity to program the one or more FPGA units.

In some embodiments, at step/operation 1304, the CFP computing entity 106 generates a VTI public/private key pair on the VTI. The VTI public/private key pair may comprise a VTI public key $VTI_{Pub}$ and a VTI private key $VTI_{Priv}$.

In some embodiments, at step/operation 1306, the CFP computing entity 106 provides the VTI public key $VTI_{Pub}$ from the VTI to the tenant computing entity.

In some embodiments, at step/operation 1308, the CFP computing entity 106 receives a tenant public key $IT_{Pub}$ and an initial nonce $N_0$ based on the VTI public key $VTI_{Pub}$. In some embodiments, the tenant computing entity, responsive to receiving the VTI public key $VTI_{Pub}$ from the CFP computing entity 106 provides the tenant public key $IT_{Pub}$, which is associated with the tenant computing entity, and the initial nonce $N_0$ to the VTI.

In some embodiments, at step/operation 1310, the CFP computing entity 106 requests an interface from the CFP computing entity to one or more FPGA units based on the tenant public key $IT_{Pub}$ and the initial nonce $N_0$. In some embodiments, requesting the interface to the one or more FPGA units comprises (i) providing the tenant public key $IT_{Pub}$ and the initial nonce $N_0$ to the CFPRoT and (ii) receiving an asymmetrically encrypted DSID (e.g., A(DSID)) 718) that is generated by the CFPRoT based on the tenant public key $IT_{Pub}$ and the initial nonce $N_0$ to the CFPRoT. In some embodiments, the CFPRoT is configured to asymmetrically encrypt a DSID (e.g., DSID 714) into the asymmetrically encrypted DSID by using the tenant public key $IT_{Pub}$ and the initial nonce $N_0$ to the CFPRoT. In some embodiments, the asymmetrically encrypted DSID comprises (a) a double-encrypted identifier and (b) a single-encrypted identifier. In some embodiments, the double-encrypted identifier may be expressed as $A(IT_{Pub}, [A(DS_{Priv}, N_0 \oplus DSID)])$, which comprises an asymmetric encryption, using the tenant public key $IT_{Pub}$, of an asymmetric encryption, using a CFPRoT private key $DS_{Priv}$ that is associated with the CFPRoT, of a XOR operation performed on the initial nonce $N_0$ and the DSID. In some embodiments, the single-encrypted identifier may be expressed as $A(IT_{Pub}, N_0 \oplus DSID)$, which comprises an asymmetric encryption, using the tenant public key $IT_{Pub}$, of a XOR operation performed on the initial nonce $N_0$ and the DSID.

Figure 14:
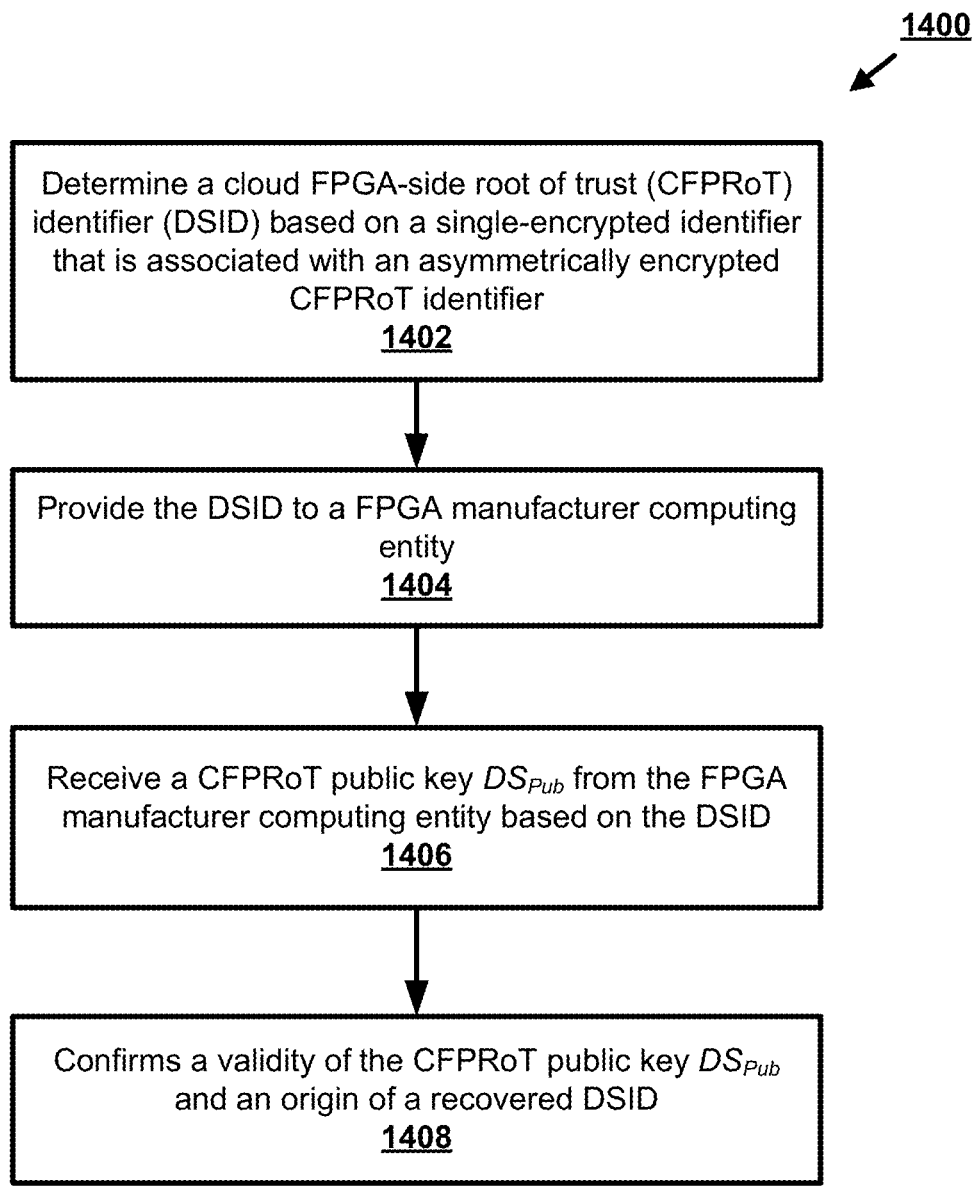
FIG. 14 is a flowchart of an example process for establishing a pseudo-TEE according to some embodiments of the present disclosure.

FIG. 14 is a flowchart of an example process 1400 for establishing a pseudo-TEE according to some embodiments of the present disclosure.

In some embodiments, the process 1400 begins at step/operation 1402 when a select one of the tenant computing entities 102 determines a DSID based on a single-encrypted identifier that is associated with an asymmetrically encrypted DSID. In some embodiments, determining the DSID comprises (i) decrypting the single-encrypted identifier with a tenant private key $IT_{Priv}$ that is associated with the select one of the tenant computing entities 102 and (ii) generating an XOR operation result based on the decrypted single-encrypted identifier and an initial nonce $N_0$ (e.g., as provided at step/operation 1308).

In some embodiments, at step/operation 1404, the select one of the tenant computing entities 102 provides the DSID to a FPGA manufacturer computing entity. For example, the select one of the tenant computing entities 102 may provide a query that comprises the DSID to the FPGA manufacturer computing entity. In some embodiments, the FPGA manufacturer computing entity 104 may provide a lookup service that returns a public key $DS_{Pub}$ that matches a query comprising a given DSID.

In some embodiments, at step/operation 1406, the select one of the tenant computing entities 102 receives a CFPRoT public key $DS_{Pub}$ from the FPGA manufacturer computing entity based on the DSID. Accordingly, the CFPRoT public key $DS_{Pub}$ may be used to recover a DSID from the double-encrypted identifier that is associated with the asymmetrically encrypted DSID.

In some embodiments, at step/operation 1408, the select one of the tenant computing entities 102 confirms a validity of the CFPRoT public key $DS_{Pub}$ and an origin of a recovered DSID. In some embodiments, confirming an origin of a recovered DSID comprises generating the recovered DSID based on the CFPRoT public key $DS_{Pub}$ and a tenant private key $IT_{Priv}$. In some embodiments, generating the recovered DSID comprises asymmetrically decrypting, using the CFPRoT public key $DS_{Pub}$ and a tenant private key $IT_{Priv}$, a double encrypted identifier that is associated with the asymmetrically encrypted DSID.

Figure 15:
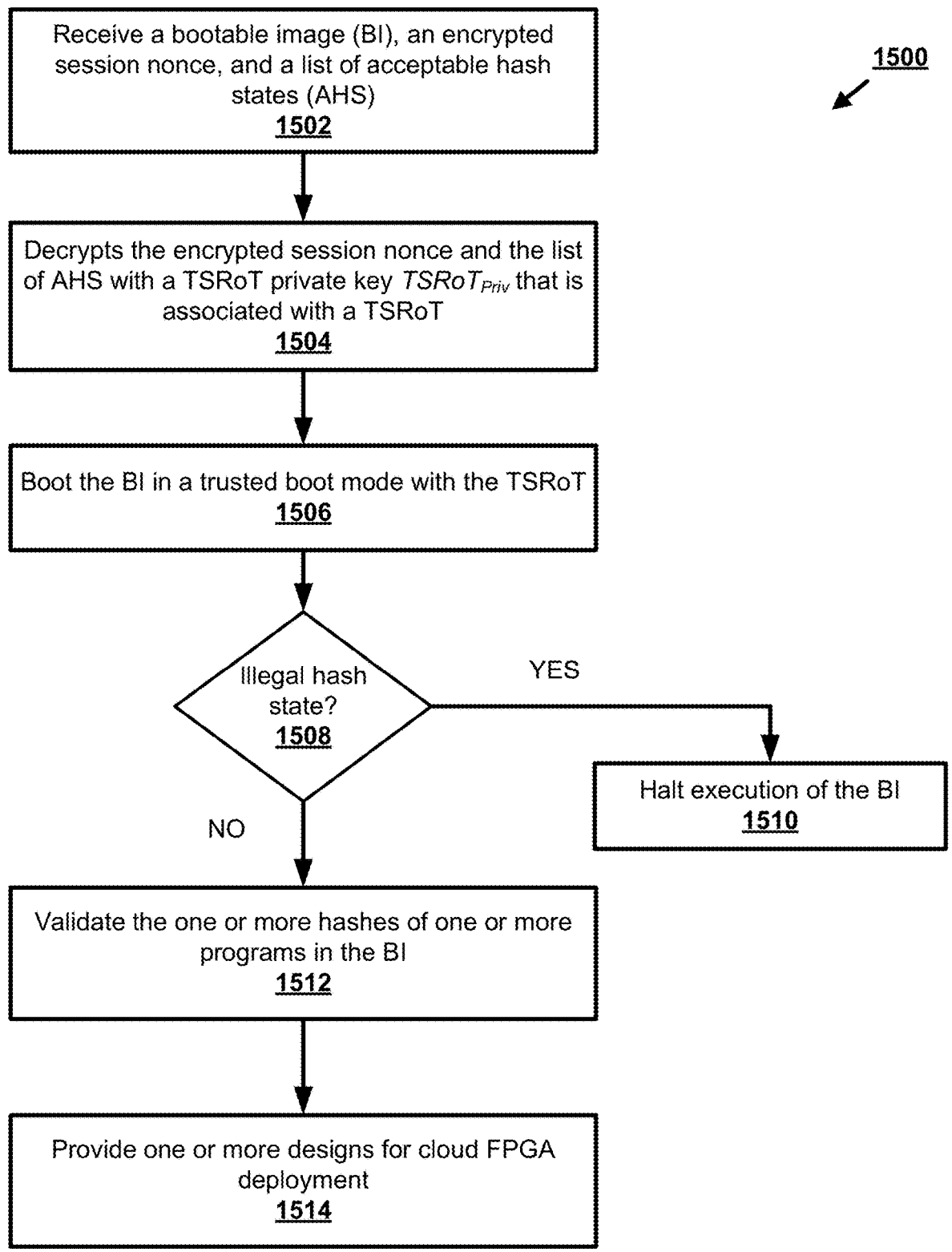
FIG. 15 is a flowchart of an example process for validating a BI in a pseudo-TEE according to some embodiments of the present disclosure.

FIG. 15 is a flowchart of an example process 1500 for validating a BI in a pseudo-TEE according to some embodiments of the present disclosure.

In some embodiments, the process 1500 begins at step/operation 1502 when a select one of the tenant computing entities 102 receives, from a CFP computing entity, (i) a BI, (ii) an encrypted session nonce, and (iii) a list of AHS. The BI may comprise an executable (e.g., that comprises steps/operations that are discussed with respect to the description of FIG. 12). The encrypted session nonce may comprise a session nonce $N_1$ that is asymmetrically encrypted with a TSRoT public key $TSRoT_{Pub}$ that is associated with a TSRoT (e.g., provided as $A(TSRoT_{Pub}, N_1)$). The list of AHS may comprise one or more hash states that are used to determine whether operation of a BI in a trusted boot mode should be halted based on a hash state of the BI. In some embodiments, the list of AHS is also encrypted with the TSRoT public key $TSRoT_{Pub}$.

In some embodiments, at step/operation 1504, the select one of the tenant computing entities 102 decrypts the encrypted session nonce and the list of AHS with a TSRoT private key $TSRoT_{Priv}$ that is associated with a TSRoT. According to various embodiments of the present disclosure, the TSRoT is configured on the select one of the tenant computing entities 102. In some embodiments, decrypting the encrypted session nonce and the list of AHS comprises forwarding the encrypted session nonce and the list of AHS to the TSRoT for decryption with its private key $TSRoT_{Priv}$. Upon decryption, a session nonce $N_1$ (recovered from the encrypted session nonce) and a decrypted list of AHS are stored by the TSRoT.

In some embodiments, at step/operation 1506, the select one of the tenant computing entities 102 boots the BI in a trusted boot mode with the TSRoT. According to various embodiments of the present disclosure, if execution of any program in the BI causes the select one of the tenant computing entities 102 to enter a hash state that is not allowed based on the list of AHS, the TSRoT may be configured to halt execution of the BI (or stop operation of the select one of the tenant computing entities 102).

In some embodiments, at step/operation 1508, the select one of the tenant computing entities 102 determines whether one or more hashes of one or more programs in the BI comprise an illegal hash state. In some embodiments, determining whether the one or more hashes comprise an illegal hash state comprises, via the TSRoT (i) determining one or more hashes of one or more programs to be executed and (ii) comparing the one or more hashes to the list of AHS.

In some embodiments, if the one or more hashes comprise an illegal hash state, at step/operation 1510, the select one of the tenant computing entities 102 (e.g., via the TSRoT) halts execution of the BI.

In some embodiments, if the one or more hashes do not comprise an illegal hash state, at step/operation 1512, the select one of the tenant computing entities 102 validates the one or more hashes of one or more programs in the BI. The TSRoT may be used to check the hashes of programs in the BI against valid hash values (e.g., assigned by the program maintainers/owners). According to various embodiments of the present disclosure, validating the one or more hashes comprises checking an executable hash ($H_{Exec}$) of an executable from the BI against a true hash value that is provided by an FPGA manufacturer computing entity (FPGA manufacturer computing entity 104). In some embodiments, the executable comprises an executable public key $E_{Pub}$, an executable private key $E_{Priv}$, and an EID. In some embodiments, the FPGA manufacturer computing entity maintains a lookup service server that returns a matching executable private key $E_{Priv}$ when provided with an EID. In some embodiments, checking the executable hash ($H_{Exec}$) of the executable comprises (i) obtaining a self-signed EID from the executable, (ii) providing the self-signed EID to the FPGA manufacturer computing entity, (iii) receiving a true hash value from the FPGA manufacturer computing entity, and (iv) comparing the executable hash ($H_{Exec}$) with the true hash value.

In some embodiments, at step/operation 1514, the select one of the tenant computing entities 102 provides one or more designs for cloud FPGA deployment. In some embodiments, providing the one or more designs comprises generating one or more bitstreams based on the one or more designs. Once the validity of programs in the BI are ensured, the select one of the tenant computing entities 102 may be allowed to provide the one or more designs to one or more FPGA units that are associated with a CFP computing entity (e.g., CFP computing entity 106) via the executable. In some embodiments, the executable may be configured with design rules and arbitrary checks along with a second nonce $N_2$ by the CFP computing entity upon a confirmation that the BI was started in trusted boot mode. The design rules and arbitrary checks and the second nonce $N_2$ may be provided to the executable as $A(E_{Pub}, DR+AC \oplus N_2)$ and $A(E_{Pub}, N_2)$, respectively.

Figure 16:
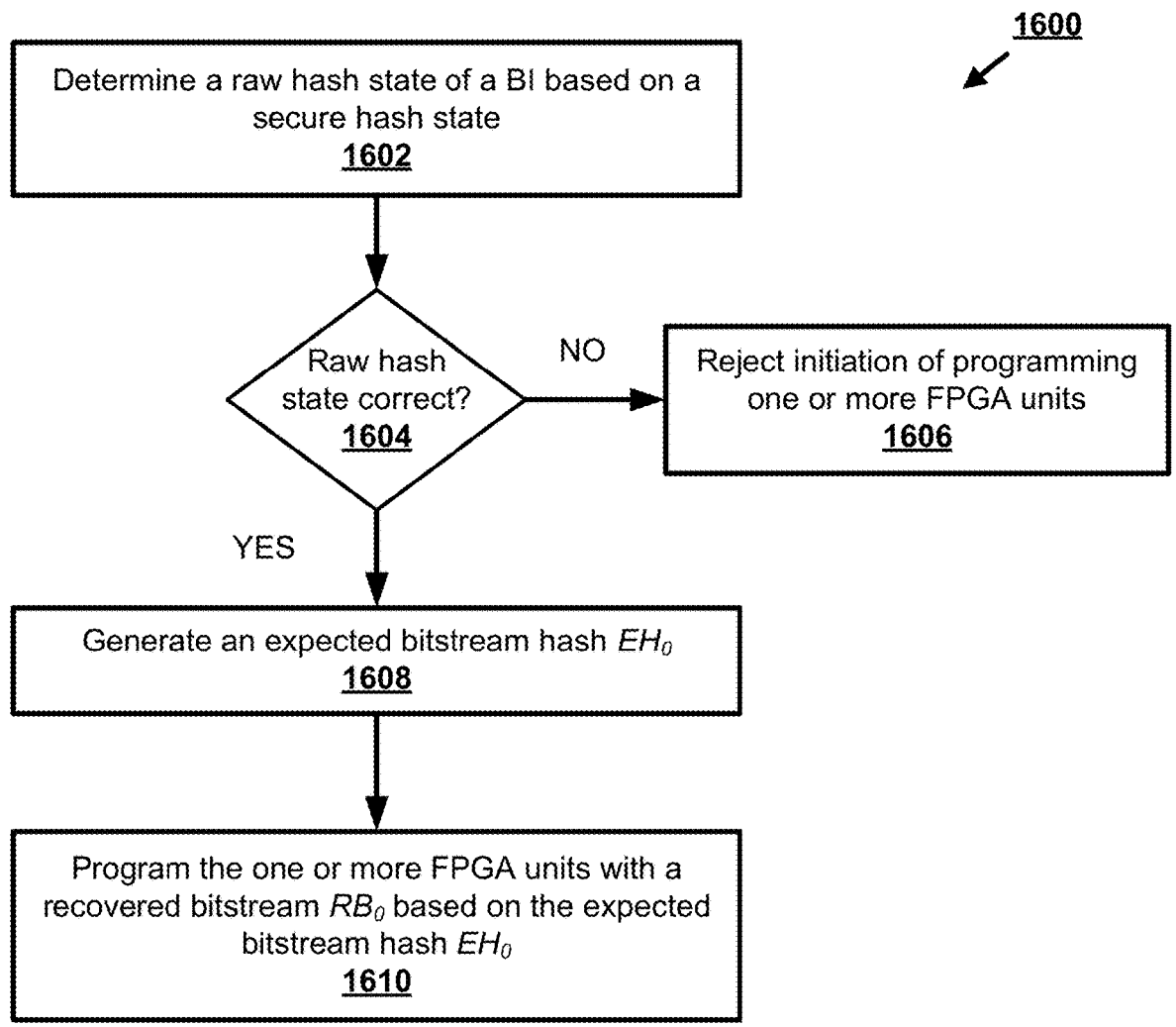
FIG. 16 is a flowchart of an example process for trusting one or more designs during cloud FPGA deployment according to some embodiments of the present disclosure.

FIG. 16 is a flowchart of an example process 1600 for trusting one or more designs during cloud FPGA deployment according to some embodiments of the present disclosure.

In some embodiments, via the various steps/operations of the process 1600, deployment of one or more designs to one or more FPGA units is ensured without being modified by any party or exposed to a CFP computing entity that provides the one or more FPGA units. As discussed herein, the select one of the tenant computing entities 102 may be allowed to provide one or more designs for cloud FPGA deployment via the CFP computing entity 106 upon validating one or more programs in a BI that is booted with a TSRoT on the select one of the tenant computing entities 102.

In some embodiments, the process 1600 begins at step/operation 1602 when the CFP computing entity 106 determines a raw hash state of a BI executing on the select one of the tenant computing entities 102 based on a SHS. In some embodiments, the raw hash state is determined by an operation that is represented by $A^{-1}(CFP_{Priv}, [A^{-1} (TSRoT_{Pub}, SHS)]) \oplus N_1$, which comprises double asymmetrically decrypting the SHS based on (i) a TSRoT public key $TSRoT_{Pub}$ and (ii) a CFP private key $CFP_{Priv}$, and generating an XOR operation result based on the decrypted SHS and the session nonce $N_1$.

The SHS may be received from the select one of the tenant computing entities 102. According to various embodiments of the present disclosure, the SHS may be generated by the select one of the tenant computing entities 102 based on a current hash state of a BI that is executing on the select one of the tenant computing entities 102 in a trusted boot mode. In some embodiments, the current hash state is determined by querying a TSRoT that is associated with the select one of the tenant computing entities 102. In some embodiments, the SHS is generated by performing an XOR operation on the current hash state with a session nonce $N_1$ (e.g., that provided by the CFP computing entity 106 as described with reference to the description of step/operation 1502) that is double asymmetrically encrypted by self-signing with a TSRoT private key $TSRoT_{Priv}$ and encrypting with a CFP public key $CFP_{Pub}$. In some embodiments, receiving the SHS further comprises receiving an encrypted bitstream (e.g., a third encrypted bitstream generated via step/operation 1208) and a SDR data object (e.g., generated via step/operation 1210) from the select one of the tenant computing entities 102.

In some embodiments, at step/operation 1604, the CFP computing entity 106 determines whether the raw hash state is correct.

In some embodiments, if the raw hash state is not correct, at step/operation 1606, the CFP computing entity 106 rejects initiation of programming one or more FPGA units.

In some embodiments, if the raw hash state is correct, at step/operation 1608, the CFP computing entity 106 generates an expected bitstream hash $EH_0$. In some embodiments, generating the expected bitstream hash $EH_0$ comprises (i) generating an expected DRR hash $H_{\hat{D}RR}$ by hashing (e.g., applying a hash function on) the expected DRR, (ii) double asymmetrically decrypting the SDR with (a) an executable public key $E_{Pub}$ that is associated with an executable executing on the select one of the tenant computing entities 102 and (b) a CFP private key $CFP_{Priv}$ that is associated with the CFP computing entity, and (iii) generating an XOR operation result based on the double asymmetrically decrypted SDR and the expected DRR hash $H_{\hat{D}RR}$.

In some embodiments, at step/operation 1610, the CFP computing entity 106 programs the one or more FPGA units with a recovered bitstream $RB_0$ based on the expected bitstream hash $EH_0$.

According to various embodiments of the present disclosure, the recovered bitstream $RB_0$ is generated by using a CFPRoT to decrypt a first encrypted bitstream $B_1$ with an expected bitstream hash $EH_0$. For example, the CFPRoT may perform symmetric decryption represented by $S^{-1}(EH_0, B_1)$ to generate the recovered bitstream $RB_0$. In some embodiments, the first encrypted bitstream $B_1$ is generated by the CFPRoT decrypting a second encrypted bitstream $B_2$ with a CFPRoT private key $DS_{Priv}$. In some embodiments, the second encrypted bitstream $B_2$ may be provided to the CFPRoT by a VTI. In some embodiments, the VTI may be configured to (i) receive a third encrypted bitstream $B_3$ from the select one of the tenant computing entities 102, (ii) generate the second encrypted bitstream $B_2$ by decrypting the third encrypted bitstream $B_3$ with a VTI private key $VTI_{Priv}$, (iii) confirm a state of the second encrypted bitstream $B_2$ by using a tenant public key $IT_{Pub}$, and (iv) provide the second encrypted bitstream $B_2$ to the CFPRoT.

In some embodiments, programming the one or more FPGA units further comprises determining, using the CFPRoT, whether a hash of the recovered bitstream $RB_0$ (recovered bitstream hash $H(RB_0)$) matches the expected bitstream hash $EH_0$. In some embodiments, the recovered bitstream hash $H(RB_0)$ is generated by the CFPRoT hashing (e.g., applying a same hash function as the expected bitstream hash $EH_0$ on) the recovered bitstream $RB_0$. As such, the bitstream hash $H(RB_0)$ may be compared with the expected bitstream hash $EH_0$. In some embodiments, if the recovered bitstream hash $H(RB_0)$ does not match the expected bitstream hash $EH_0$, the CFP computing entity 106 is prohibited by the CFPRoT to program the one or more FPGA units with the recovered bitstream $RB_0$. In some embodiments, if the recovered bitstream hash $H(RB_0)$ matches the expected bitstream hash $EH_0$, the CFP computing entity 106 is allowed by the CFPRoT to program the one or more FPGA units with the recovered bitstream $RB_0$.

Example Strengths and Capabilities of Various Embodiments

To understand the strengths and capabilities of various embodiments of the present disclosure, a few standard and novel cases are discussed herewith. The following is not a comprehensive list but instead focuses on high-impact or novel scenarios.

A. Malicious Cloud FPGA Provider

The case of a malicious CFP capable of Man-in-the-Middle (MITM) attacks is discussed herewith and the following cases are presented for such a situation, along with other more established cases. In each, a discussion is provided on how embodiments of the present disclosure are able to protect against nefarious action.

1) Compromised VTI: In a first example, it may be assumed that a CFP computing entity is able to recover messages intended for a VTI. However, according to various embodiments of the present disclosure, the VTI does not have the ability to view a raw bitstream $B_0$, such that any threat may be minimal.

2) CFP MITM to VTI: As a VTI exists physically on a CFP computing entity's hardware, it is possible that any message the VTI sends or receives is susceptible to being read and modified by a CFP computing entity that acts as a MITM. However, according to various embodiments of the present disclosure, the VTI does not send any message content that is used directly by a tenant computing entity, and instead, is used by the tenant computing entity to retrieve information from a FPGA manufacturer.

3) Compromised Executable: According to various embodiments of the present disclosure, should a CFP computing entity compromise an executable in a BI in any way, the hash of the executable will be different, alerting a tenant computing entity before they run it.

4) Compromised Executable and BI: According to various embodiments of the present disclosure, should a CFP computing entity compromise an executable and modify a BI such that the hash calculated by a TSRoT for the executable returns correctly, a tenant computing entity may create a true tenant bitstream $B_{it}$ themselves, for example, by using standard design tools. Using such tools, the tenant computing entity may find a true value tenant hash $H_{it}$ and confirm the state of $B_1$ through $S(H_{it}, B_{it})$ as the result should be identical to $B_1$, where $S(K, M)$ refers to symmetric encryption of M with key K. As the only communications leaving the BI are $B_1$, which the tenant computing entity may check directly, and SDR, which the client cannot check, but as a XORed hash and has a fixed size much smaller than the bitstream, thus the CFP computing entity cannot use it to covertly exfiltrate a client's design.

5) CFP MITM to FPGA to Program: According to various embodiments of the present disclosure, should a CFP computing entity pretend to be a FPGA to program in an effort to recover $B_0$, they will be unable to process $B_2$, as it is encrypted with $DS_{Pub}$. As $DS_{Pub}$ is obtained by the tenant computing entity directly from the FM, it is safe from modification by CFP computing entity. Replay attacks where a CFP computing entity reuses a tenant computing entity's design sent to the DS may be easily avoided with an additional stage of nonce.

6) Modify or View $B_3/B_2$: According to various embodiments of the present disclosure, as $B_3$ and $B_2$ are encrypted with public keys belonging to other entities, a CFP computing entity cannot access them. Additionally, while the CFP computing entity may be able to replace $B_2$ entirely, as they do not know what $B_2$ should be doing or its content, it is unlikely to respond to the tenant computing entity.

B. Malicious Tenant

The following provides a discussion of traditional examples in which the tenant is malicious as well as few cases specific to the disclosed CFPRoT and DLD.

1) Malicious Circuit Insertion or Modify $B_0$: CFP computing entities may prevent malicious circuits from tenant computing entities being run on their FPGAs by using design rules to detect them. Should a tenant computing entity attempt to add a malicious circuit to their design, the DRR will be different than the passing results known by a CFP computing entity. As such, the hash HDRR will be different than the predicted hash $H_{\hat{D}RR}$. In such a case, according to various embodiments of the present disclosure when the CFP calculates $H_{\hat{D}RR} \oplus H_{DRR} = \hat{H}_0$, and $\hat{H}_0 \neq H_0$, the CFPRoT will not pass the check.

2) Replay or modify SDR: According to various embodiments of the present disclosure, if a tenant computing entity captures and attempts to reuse an SDR from a prior session, as the AC component of the DR+AC should have changed, their attempt will fail as the $H_{\hat{D}RR}$ will have also changed. Additionally, even though the tenant computing entity may have $H_0$, as the SDR is encrypted by a CFP public key $CFP_{Pub}$ of the CFP before it leaves the executable, tenant is unable to recover the original HDRR. As BI includes no way to check the state of memory while BI is running, the tenant computing entity would have to modify BI to include it, resulting in the TSRoT halting execution.

3) Recover DR+AC: In order to recover DR+AC, the tenant must recover $E_{Priv}$. According to various embodiments of the present disclosure, any attempts to do so at the software level (e.g., running programs) should be blocked by TSRoT as the hash of the program to run will not be in the AHS provided by the CFP computing entity. Additionally, snooping or sniffing attacks at the bus level may be mitigated by the hardware requirements of the CFP computing entity, as the BI should only contain drivers or accept connections from approved hardware, which should be capable of sending and receiving encrypted bus communication.

CONCLUSION

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A method of protecting a hardware design against confidentiality and integrity attacks, the method comprising:
generating a bitstream $B_0$ based on a design;
determining one or more design rule results (DRR) of the design based on one or more design rules that are associated with a cloud field-programmable gate array (FPGA) provider (CFP) computing entity;
generating (i) a bitstream hash $H_0$ based on the bitstream $B_0$ and (ii) a DRR hash $H_{DRR}$ based on the one or more DRR;
generating an encrypted bitstream based on one or more of the bitstream hash $H_0$, a CFP-side root of trust (CFPRoT) public key $DS_{Pub}$, or a virtual tenant instance (VTI) public key $VTI_{Pub}$; and generating a secure design rule (SDR) data object based on the DRR hash $H_{DRR}$.

2. The method of claim 1, wherein the CFP computing entity is configured to: generate a virtual tenant instance (VTI) based on request for one or more cloud FPGA computing resources; and generate a VTI public/private key pair on the VTI, wherein the VTI public/private key pair comprises the VTI public key $VTI_{Pub}$ and a VTI private key $VTI_{Priv}$.

3. The method of claim 2 further comprising:
receiving the VTI public key $VTI_{Pub}$; and
responsive to receiving the VTI public key $VTI_{Pub}$, providing (i) a tenant public key $IT_{Pub}$ that is associated with a tenant computing entity and (ii) an initial nonce $N_0$ to the VTI.

4. The method of claim 3, wherein the VTI is configured to request an interface from the CFP computing entity to one or more FPGA units based on the tenant public key $IT_{Pub}$ and the initial nonce $N_0$ by:
providing the tenant public key $IT_{Pub}$ and the initial nonce $N_0$ to a CFPRoT; and
receiving (i) a double-encrypted identifier, the double-encrypted identifier comprising an asymmetric encryption, using the tenant public key $IT_{Pub}$, of an asymmetric encryption, using a CFPRoT private key $DS_{Priv}$ that is associated with the CFPRoT, of a XOR operation result, and (ii) a single-encrypted identifier, the single-encrypted identifier comprising an asymmetric encryption, using the tenant public key $IT_{Pub}$, of the XOR operation result, wherein the XOR operation result is based on the initial nonce $N_0$ and a CFPRoT identifier that is associated with the CFPRoT.

5. The method of claim 4, further comprising:
receiving the single-encrypted identifier;
decrypting the single-encrypted identifier with a tenant private key $IT_{Priv}$ associated with the tenant computing entity; and
determining the CFPRoT identifier by generating an XOR operation result based on the decrypted single-encrypted identifier and the initial nonce $N_0$.

6. The method of claim 5, further comprising:
providing the CFPRoT identifier to a FPGA manufacturer computing entity;
receiving the CFPRoT public key $DS_{Pub}$ from the FPGA manufacturer computing entity based on the CFPRoT identifier;
generating a recovered CFPRoT identifier by decrypting the double-encrypted identifier with the tenant private key $IT_{Priv}$ and the CFPRoT public key $DS_{Pub}$; and
confirming validity of (i) the CFPRoT public key $DS_{Pub}$ and (i) an origin of the CFPRoT identifier recovered.

7. The method of claim 6 further comprising:
receiving, from the CFP computing entity, (i) a bootable image (BI) comprising an executable and (ii) an encrypted session nonce $N_1$ that is encrypted with a tenant-side root of trust (TSRoT) public key $TSRoT_{Pub}$ that is associated with a TSRoT; and
decrypting the encrypted session nonce $N_1$ with a TSRoT private key $TSRoT_{Priv}$ that is associated with the TSRoT.

8. The method of claim 7 further comprising receiving a list of acceptable hash states (AHS) from the CFP computing entity.

9. The method of claim 8, wherein the list of AHS is encrypted with the TSRoT public key $TSRoT_{Pub}$ and further comprising decrypting the list of AHS with the TSRoT private key $TSRoT_{Priv}$.

10. The method of claim 8, further comprising comparing an executable hash of the executable with a true hash that is associated with the executable.

11. The method of claim 10, further comprising receiving a secure hash state (SHS) from the TSRoT, the SHS comprising an XOR operation result based on a current hash state and a session nonce $N_1$.

12. The method of claim 11, wherein the CFP computing entity is configured to determine a raw hash chain state of the BI by (i) double asymmetrically decrypting the SHS based on (a) the TSRoT public key $TSRoT_{Pub}$ and (b) a CFP private key $CFP_{Priv}$ and (ii) generating an XOR operation result based on the decrypted SHS and the session nonce $N_1$.

13. The method of claim 1, wherein the CFP computing entity is configured to generate an expected bitstream hash $EH_0$ by (i) generating an expected DRR hash $H_{DRR}$ by hashing an expected DRR, (ii) double asymmetrically decrypting the SDR with (a) an executable public key $E_{Pub}$ that is associated with an executable and (b) a CFP private key $CFP_{Priv}$ that is associated with the CFP computing entity, and (iii) generating an XOR operation result based on the double asymmetrically decrypted SDR and the expected DRR hash $H_{DRR}$.

14. The method of claim 13, wherein the CFP computing entity is configured to receive and convert a third encrypted bitstream $B_3$ into a second encrypted bitstream $B_2$.

15. The method of claim 14, wherein the VTI is configured to generate the second encrypted bitstream $B_2$ by decrypting the third encrypted bitstream $B_3$ with a VTI private key $VTI_{Priv}$ that is associated with the VTI.

16. The method of claim 15, wherein the CFPRoT is configured to:
receive the second encrypted bitstream $B_2$ from the VTI; and
generate a first encrypted bitstream $B_1$ by decrypting the second encrypted bitstream $B_2$ with a CFPRoT private key $DS_{Priv}$ that is associated with the CFPRoT.

17. The method of claim 16, wherein the CFPRoT is configured to generate a recovered bitstream $RB_0$ by decrypting the first encrypted bitstream $B_1$ with the expected bitstream hash $EH_0$.

18. The method of claim 17, wherein the CFPRoT is configured to:
compare a recovered bitstream hash $H(RB_0)$ of the recovered bitstream $RB_0$ with the expected bitstream hash $EH_0$; and
program one or more FPGA units with the recovered bitstream $RB_0$ based on the comparison.

19. A computing system comprising memory and one or more processors communicatively coupled to the memory, the one or more processors configured to:
generate a bitstream $B_0$ based on a design;
determine one or more design rule results (DRR) of the design based on one or more design rules that are associated with a cloud field-programmable gate array (FPGA) provider (CFP) computing entity;
generate (i) a bitstream hash $H_0$ based on the bitstream $B_0$ and (ii) a DRR hash $H_{DRR}$ based on the one or more DRR;
generate an encrypted bitstream based on one or more of the hash $H_0$, a CFP-side root of trust (CFPRoT) public key $DS_{Pub}$, or a virtual tenant instance (VTI) public key $VTI_{Pub}$; and
generate a secure design rule (SDR) data object based on the DRR hash $H_{DRR}$.

* * * * *